(12) United States Patent
Mansouri et al.

(10) Patent No.: US 12,202,208 B2
(45) Date of Patent: Jan. 21, 2025

(54) SYSTEM AND METHOD FOR SELECTIVELY POST-CURING PARTS PRINTED WITH STEREOLITHOGRAPHY ADDITIVE MANUFACTURING TECHNIQUES

(71) Applicant: SprintRay Inc., Los Angeles, CA (US)

(72) Inventors: Amir Mansouri, Los Angeles, CA (US); Hossein Bassir, Los Angeles, CA (US); Aayush Patel, Los Angeles, CA (US); Huijian Tian, Los Angeles, CA (US)

(73) Assignee: SprintRay, Inc., Los Angeles, CA (US)

( * ) Notice: Subject to any disclaimer, the term of this patent is extended or adjusted under 35 U.S.C. 154(b) by 0 days.

(21) Appl. No.: 18/216,471

(22) Filed: Jun. 29, 2023

(65) Prior Publication Data

US 2023/0339190 A1 Oct. 26, 2023

Related U.S. Application Data

(63) Continuation of application No. 17/902,221, filed on Sep. 2, 2022, now Pat. No. 11,691,346, which is a
(Continued)

(51) Int. Cl.
*B29C 64/393* (2017.01)
*B29C 64/129* (2017.01)
(Continued)

(52) U.S. Cl.
CPC .......... *B29C 64/393* (2017.08); *B29C 64/129* (2017.08); *B29C 64/264* (2017.08);
(Continued)

(58) Field of Classification Search
CPC ... B29C 64/106; B29C 64/124; B29C 64/129; B29C 64/135; B29C 64/264;
(Continued)

(56) References Cited

U.S. PATENT DOCUMENTS

| D313,606 S | 1/1991 | Roth | |
|---|---|---|---|
| 6,030,588 A * | 2/2000 | Ball | .......... C30B 29/54 422/250.1 |

(Continued)

*Primary Examiner* — Galen H Hauth
*Assistant Examiner* — Lawrence D. Hohenbrink, Jr.
(74) *Attorney, Agent, or Firm* — JAFARI LAW GROUP, INC.

(57) ABSTRACT

The present subject matter is directed towards a system and a method for selectively post-curing a three-dimensional (3D-printed) object to attain variable properties. The system comprises a selective post-curing chamber coupled to a computer in communication with a database for accessing a digital model or data concerning the 3D-printed object. The chamber comprises a movable light source assembly and a mounting platform for supporting at least one 3D-printed object thereon. The computer includes one or more executable instructions for selectively emitting a curing light onto the 3D-printed object along a predetermined curing toolpath based on the digital model. The curing of the 3D-printed object along the predetermined curing toolpath generates variable properties along different regions of the 3D-printed object.

14 Claims, 24 Drawing Sheets

Related U.S. Application Data continuation of application No. 17/511,881, filed on Oct. 27, 2021, now Pat. No. 11,433,619.

(60) Provisional application No. 63/083,772, filed on Sep. 25, 2020.

(51) Int. Cl.
| | |
|---|---|
| *B29C 64/264* | (2017.01) |
| *B33Y 30/00* | (2015.01) |
| *B33Y 50/02* | (2015.01) |
| *B29C 35/08* | (2006.01) |
| *B29C 64/106* | (2017.01) |
| *B29C 64/124* | (2017.01) |
| *B29C 64/135* | (2017.01) |
| *B29C 64/277* | (2017.01) |
| *B29C 64/295* | (2017.01) |
| *B29C 64/30* | (2017.01) |
| *B29C 71/02* | (2006.01) |
| *B29C 71/04* | (2006.01) |
| *B33Y 40/20* | (2020.01) |

(52) U.S. Cl.
CPC ............... *B33Y 30/00* (2014.12); *B33Y 50/02* (2014.12); *B29C 2035/0827* (2013.01); *B29C 64/106* (2017.08); *B29C 64/124* (2017.08); *B29C 64/135* (2017.08); *B29C 64/277* (2017.08); *B29C 64/295* (2017.08); *B29C 64/30* (2017.08); *B29C 71/02* (2013.01); *B29C 71/04* (2013.01); *B33Y 40/20* (2020.01)

(58) Field of Classification Search
CPC ..... B29C 64/277; B29C 64/295; B29C 64/30; B29C 64/393; B29C 2035/0827; B29C 71/02; B29C 71/04; B33Y 30/00; B33Y 50/02; B33Y 40/20
USPC .................................................. 425/135, 375
See application file for complete search history.

(56) References Cited

U.S. PATENT DOCUMENTS

| | | |
|---|---|---|
| 7,114,943 B1 | 10/2006 | Fong et al. |
| 7,556,490 B2 | 7/2009 | Wicker et al. |
| D763,330 S | 8/2016 | Olive |
| D770,545 S | 11/2016 | Olive |
| D777,808 S | 1/2017 | Chang |
| D780,504 S | 3/2017 | Terao |
| D813,442 S | 3/2018 | Cho |
| D817,539 S | 5/2018 | Cho |
| D819,821 S | 6/2018 | Yamanaka |
| D829,485 S | 10/2018 | Morenstein |
| 10,357,960 B2 | 7/2019 | Miller |
| D859,907 S | 9/2019 | Morenstein |
| D861,409 S | 10/2019 | Bhogal |
| D878,136 S | 3/2020 | Bhogal |
| 10,589,466 B2 | 3/2020 | Atwood |
| D890,403 S | 7/2020 | Santoro |
| D891,169 S | 7/2020 | Gushwa |
| D892,532 S | 8/2020 | Gushwa |
| 10,779,915 B1 | 9/2020 | Kaza et al. |
| 10,857,726 B2 | 12/2020 | Tyler et al. |
| D907,245 S | 1/2021 | Rateike |
| D916,311 S | 4/2021 | Yoo |
| D930,905 S | 9/2021 | Tan |
| D932,723 S | 10/2021 | Ewin |
| D933,600 S | 10/2021 | Wang |
| D941,074 S | 1/2022 | Lavins |
| D954,487 S | 6/2022 | Li |
| D955,800 S | 6/2022 | Kim |
| D956,997 S | 7/2022 | Lee |
| 11,433,619 B1 | 9/2022 | Mansouri |
| D966,611 S | 10/2022 | Tan |
| 2014/0088751 A1 | 3/2014 | Pridoeh et al. |
| 2017/0007359 A1 | 1/2017 | Kopelman et al. |
| 2017/0100891 A1 | 4/2017 | Meisner |
| 2017/0355146 A1 | 12/2017 | Buller et al. |
| 2018/0141243 A1 | 5/2018 | Mochizuki et al. |
| 2018/0207863 A1 | 7/2018 | Porter |
| 2018/0222115 A1* | 8/2018 | Watanabe ............ B29C 64/241 |
| 2019/0118260 A1* | 4/2019 | Schmitt .................. B33Y 40/20 |
| 2019/0133732 A1 | 5/2019 | Mason |
| 2019/0299522 A1 | 10/2019 | Chapiro |
| 2019/0351615 A1* | 11/2019 | van de Laar ......... B29C 64/129 |
| 2020/0055242 A1* | 2/2020 | Kwak .................. B29C 64/264 |
| 2020/0269505 A1* | 8/2020 | Mansouri ............... B33Y 10/00 |
| 2022/0273409 A1* | 9/2022 | Schmid ................ A61C 19/003 |

* cited by examiner

FIG. 4C
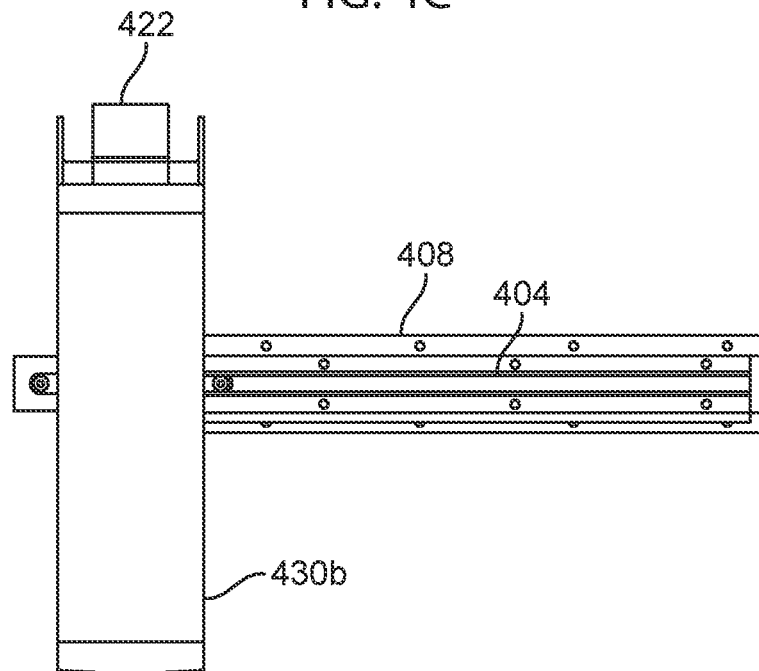
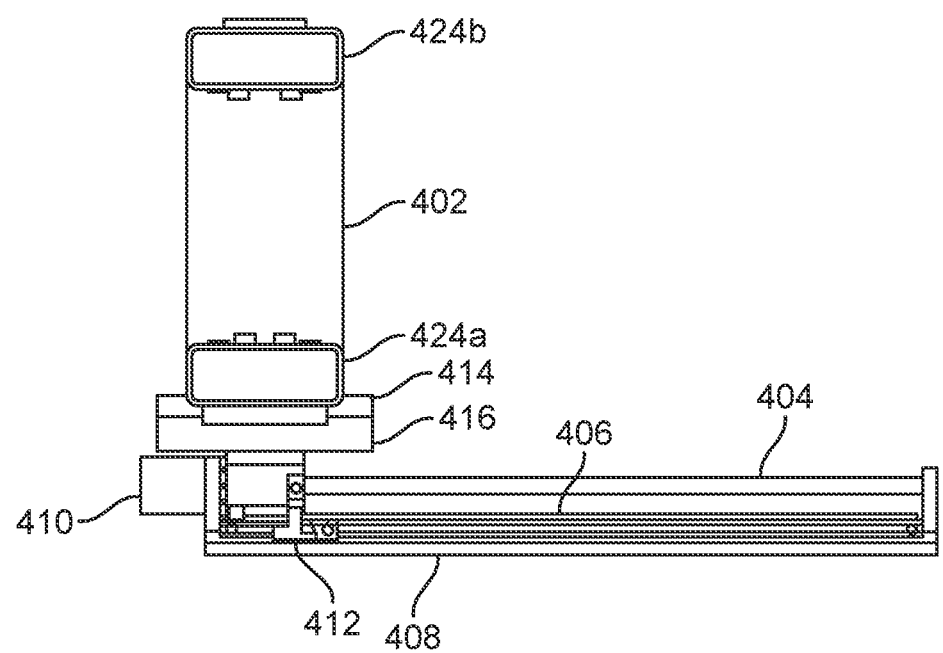
FIG. 4D

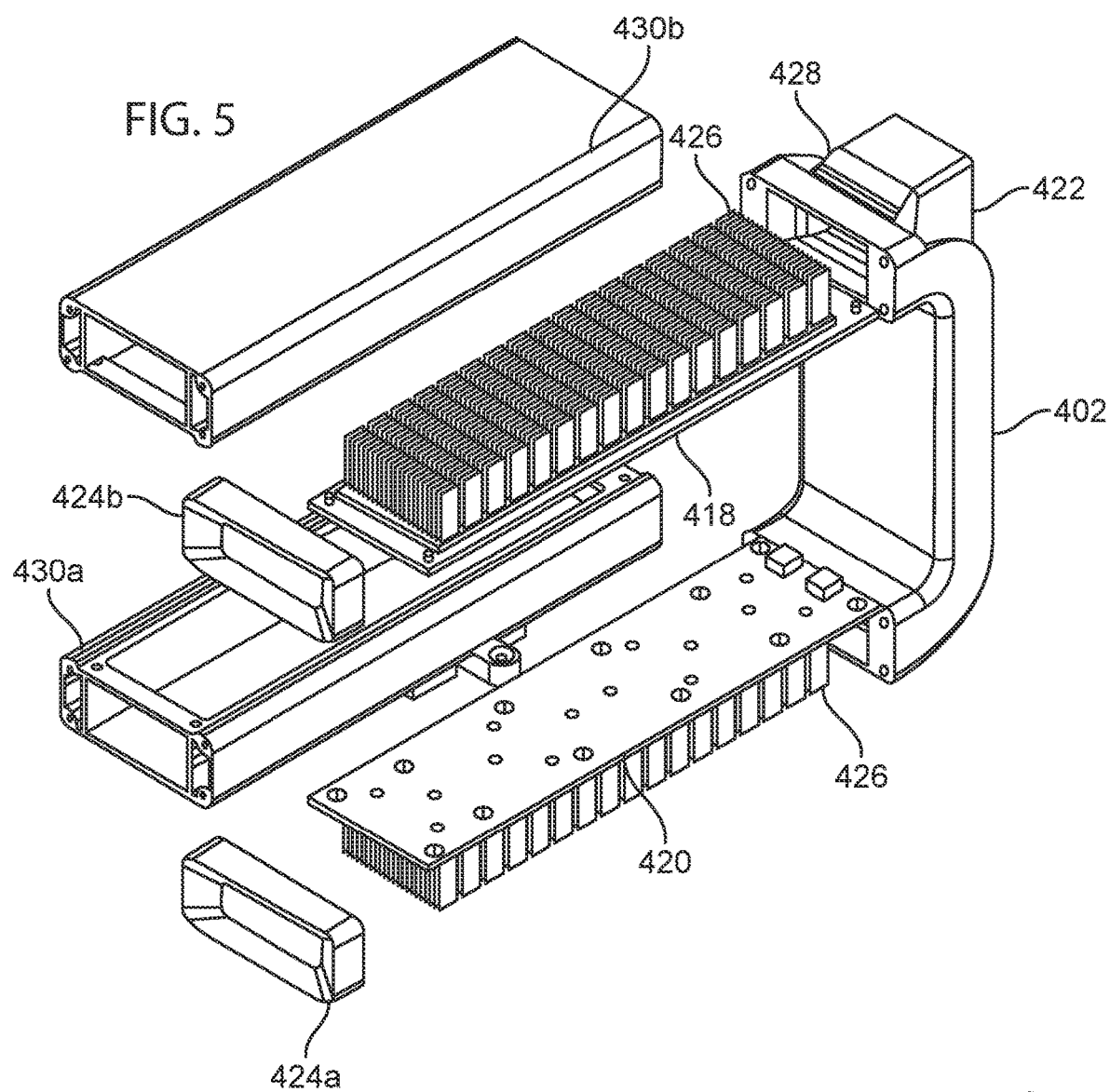
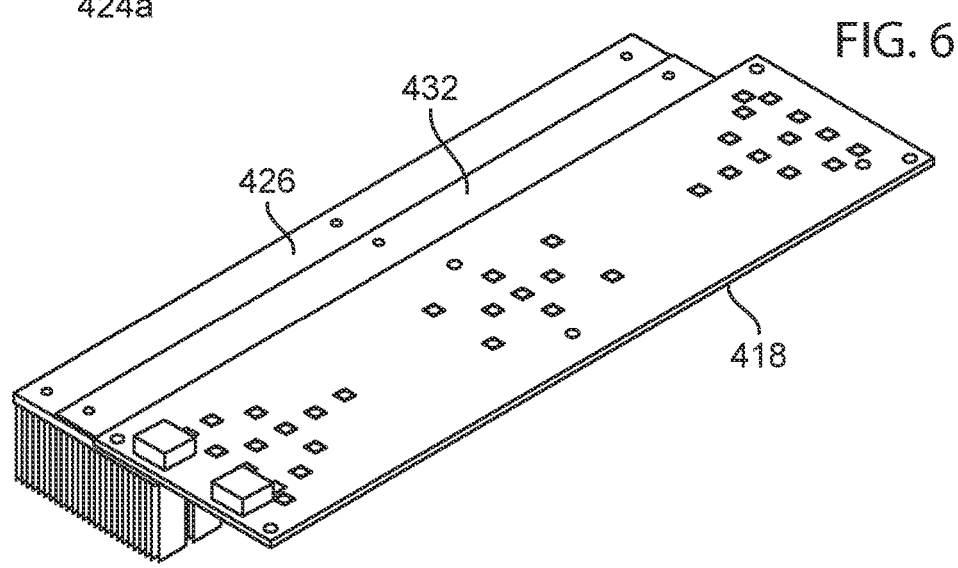

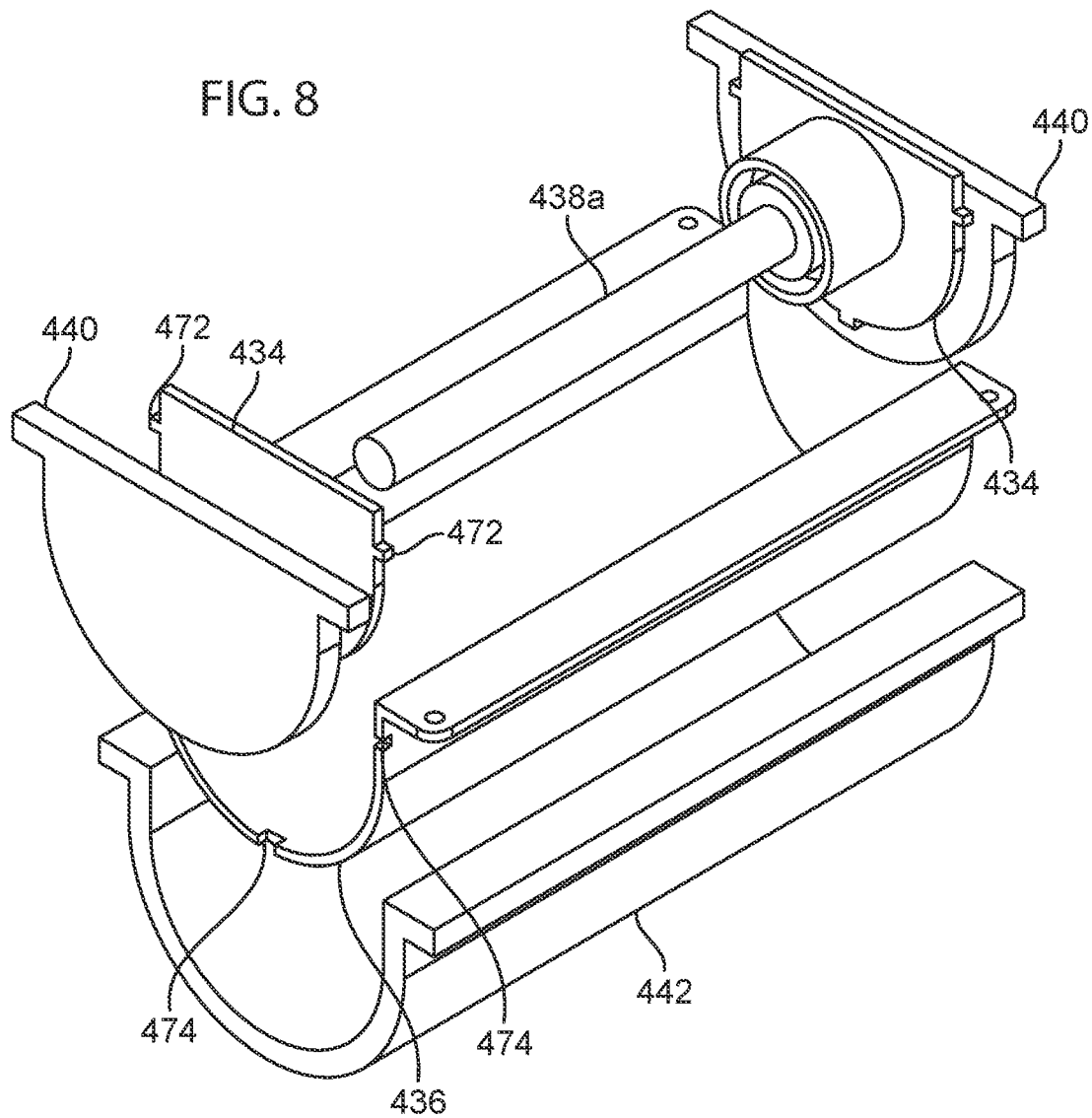

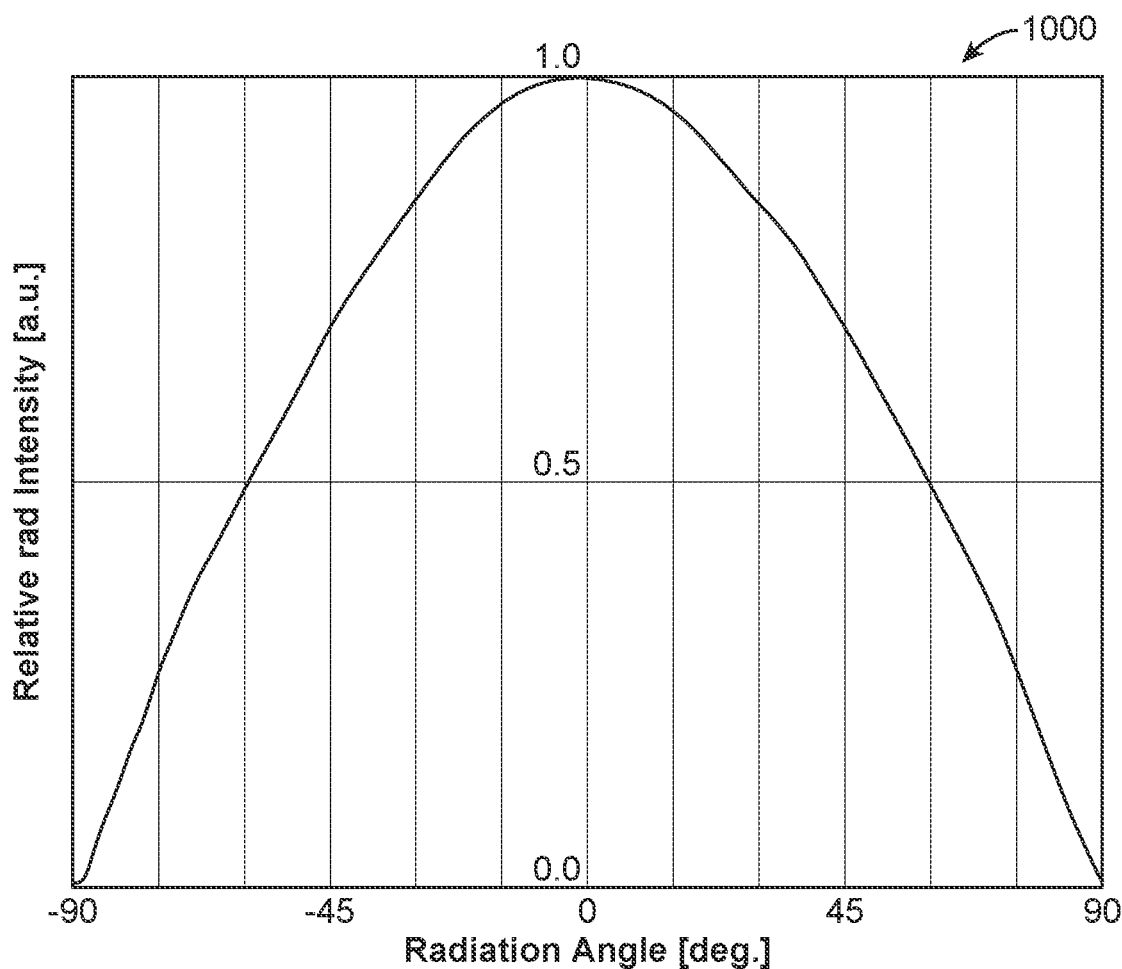

SYSTEM AND METHOD FOR SELECTIVELY POST-CURING PARTS PRINTED WITH STEREOLITHOGRAPHY ADDITIVE MANUFACTURING TECHNIQUES

PRIORITY AND RELATED APPLICATIONS

This application is a continuation of U.S. nonprovisional application Ser. No. 17/902,221, filed on Sep. 2, 2022, which is a continuation of U.S. nonprovisional application Ser. No. 17/511,881, filed on Oct. 27, 2021, which claims priority to U.S. Provisional Application No. 63/083,772, filed on filed on Sep. 25, 2020, the disclosure of which are incorporated by reference in their entirety.

TECHNICAL FIELD OF THE INVENTION

The present invention relates generally to stereolithography additive manufacturing. More specifically, the present invention relates to selectively post curing parts that have been printed with stereolithography additive manufacturing techniques.

COPYRIGHT AND TRADEMARK NOTICE

A region of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

One of the challenges of three-dimensional (3D) printing using stereolithography is that the generated 3D objects generally comprise of uniform material properties. That is, because of the current limitations and or techniques involved in 3D printing 3D objects, it has not been possible to generate or print certain 3D objects with varying material properties, which may be desirable for some applications. For example, stereolithography is one of the commonly used techniques for printing parts in many industries including dentistry. In dentistry, it may be desirable to create or print a 3D object with a variable color shade, with a variable opacity, or with other variable material properties.

Currently, once a part or 3D object is printed, the 3D object is typically post cured in a curing chamber with a massive amount of energy to achieve the desired and formulated properties. However, this process does not result in a 3D object with variable properties. Therefore, there is a need for a system and method that addresses these shortcomings, and it is to these ends that the present invention has been developed.

BRIEF SUMMARY OF THE INVENTION

According to the present invention, a system and method is described for selectively post curing three-dimensionally (3D) printed objects that have been printed with stereolithography additive manufacturing techniques, to create a cured 3D-printed object with variable properties. These variable properties may include, without limitation, a variable color shade, a variable opacity, variable flexural strengths, variable modulus, or other variable material properties that may be achieved via post-curing means.

In some exemplary embodiments, the invention involves a system for selectively post-curing a 3D-printed object to attain variable properties. This system may include: a processing module for receiving data concerning the 3D-printed object and determining a curing toolpath configured to achieve a post-cured 3D-printed object having variable properties along different regions of the 3D-printed object; and a selective post-curing module, including a chamber with a light source configured to house the 3D-printed object and selectively emitting a curing light onto the 3D-printed object.

In some exemplary embodiments, a system for selectively post-curing a 3D-printed object to attain variable properties may include: a selective post-curing chamber adapted to receive a 3D-printed object; a post-curing light source housed in the selective post-curing chamber; and a computer coupled to the post-curing light source including one or more executable instructions for selectively emitting a curing light onto the 3D-printed object along a predetermined curing toolpath based on data of the 3D-printed object, wherein curing the 3D-printed object along the predetermined curing toolpath generates variable properties along different regions of the 3D-printed object.

In some exemplary embodiments, a method for selectively post-curing a 3D-printed object to attain variable properties may include the steps of: receiving data concerning a 3D-printed object; determining a curing toolpath configured to achieve a post-cured 3D object having variable properties along different regions of the 3D-printed object; and selectively emitting a curing light onto the 3D-printed object along the curing toolpath, wherein curing the 3D-printed object along the curing toolpath generates the variable properties along the different regions of the 3D-printed object.

In some exemplary embodiments, a method for selectively post-curing a 3D-printed object to attain variable properties may include the steps of: mounting a 3D-printed object in a selective post-curing chamber including a post-curing light source configured to emit a curing light onto the 3D-printed object; receiving data of the 3D-printed object concerning a curing toolpath; and selectively emitting a curing light onto the 3D-printed object along the curing toolpath based on the model data, wherein curing the 3D-printed object along the curing toolpath generates variable properties along different regions of the 3D-printed object.

In some exemplary embodiments, the invention involves a system for selectively post-curing a 3D-printed object to attain variable properties. The system may comprise: a chamber; a platform arranged within the chamber for supporting at least one 3D-printed object; a light source assembly arranged within the chamber and configured to emit one or more wavelengths of a curing light onto the 3D-printed object; a movement module configured to move the light source assembly or the platform in order to selectively expose different regions of the 3D-printed object to the curing light along a predetermined curing path of the 3D-printed object; and a processing module in communication with the light source assembly and the movement module, the processing module including one or more executable instructions configured to: receive a user input concerning the 3D-printed object, the user input indicative of the curing path for post-curing the 3D-printed object; move the light source assembly or the platform according to the curing path; and emit the curing light onto the 3D-printed object along the curing toolpath to create a post-cured 3D-printed object.

In some exemplary embodiments, the system may comprise: a chamber; a platform arranged within the chamber for supporting at least one 3D-printed object; a light source assembly arranged within the chamber and configured to emit one or more wavelengths of a curing light onto the 3D-printed object, wherein the light source assembly includes at least one light source disposed above the platform and at least one light source disposed below the platform; a movement module configured to move the light source assembly or the platform in order to selectively expose different regions of the 3D-printed object to the curing light along a predetermined curing path of the 3D-printed object; and a processing module in communication with the light source assembly and the movement module, the processing module including one or more executable instructions configured to: receive a user input concerning the 3D-printed object, the user input indicative of the curing path for post-curing the 3D-printed object; move the light source assembly or the platform according to the curing path; and emit the curing light onto the 3D-printed object along the curing toolpath to create a post-cured 3D-printed object.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

FIG. 4C exemplarily illustrates a top view of a motion system and a light source assembly of the post-curing chamber, according to an embodiment of the present invention.

FIG. 4D exemplarily illustrates a rear view of a motion system and a light source assembly of the post-curing chamber, according to an embodiment of the present invention.

FIG. 5 exemplarily illustrates an exploded view of the light source assembly, according to an embodiment of the present invention.

FIG. 6 exemplarily illustrates a perspective view of thermal management system of the post-curing chamber, according to an embodiment of the present invention.

FIG. 8 exemplarily illustrates an exploded view of the heating element of the post-curing chamber, according to an embodiment of the present invention.

FIG. 10 exemplarily illustrates a graph of radiation patterns for a post curing system, according to an embodiment of the present invention.

DESCRIPTION OF THE INVENTION

Figure 1:
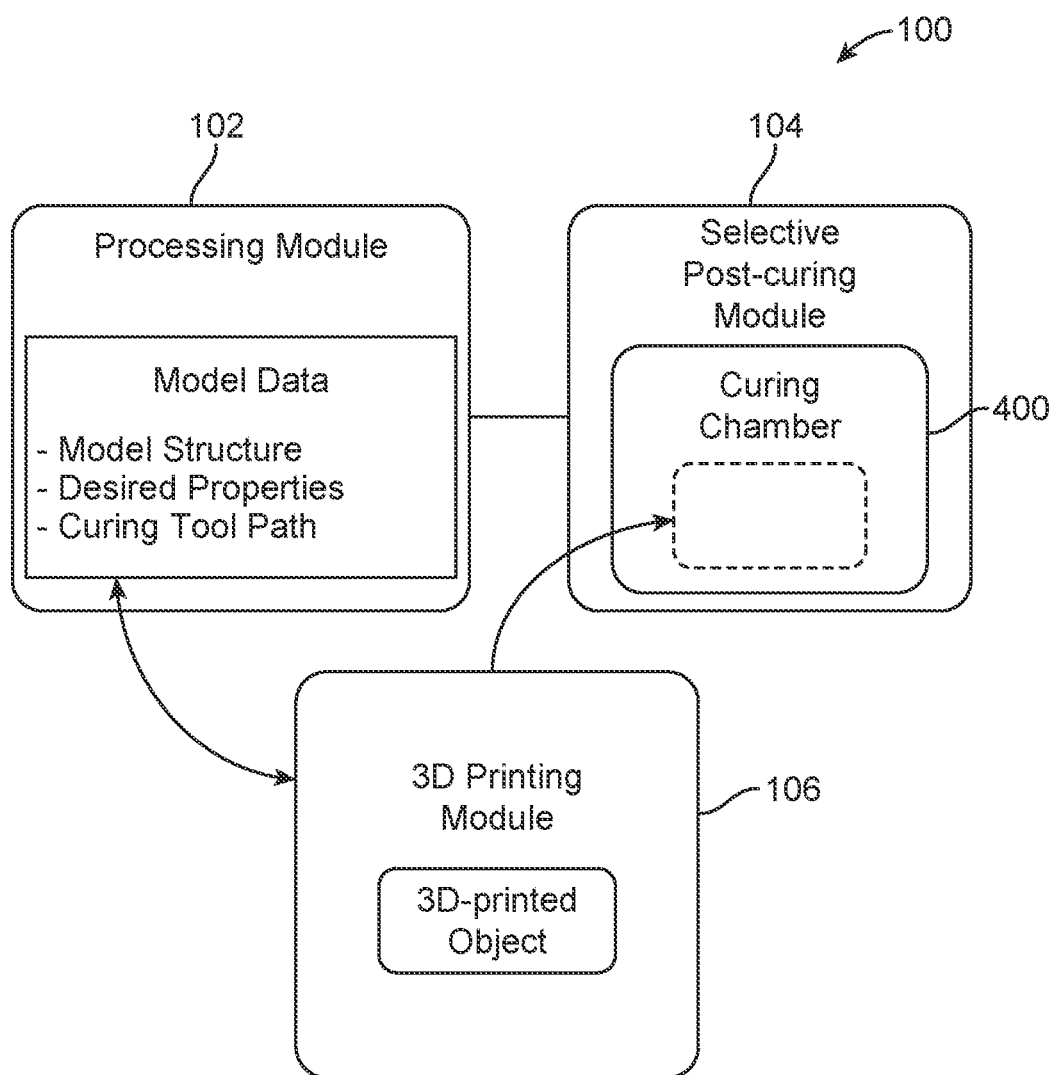
FIG. 1 exemplarily illustrates a system for selectively post-curing a three-dimensional object to attain variable properties, according to an embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps. For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

Turning now to the figures, FIG. 1 is a block diagram for a system 100 in accordance with some exemplary embodiments of the present invention. More specifically, FIG. 1 depicts system 100, which typically includes a 3D printing module 106 configured to print 3D objects, a processing module 102 configured to determine or store model data concerning the 3D-printed object, including for example data concerning desirable properties of the 3D-printed object such as desirable variable properties that may be generated by curing the 3D-printed object, and data concerning a curing path for post-curing the 3D-printed object to achieve the desired variable properties. Moreover, system 100 includes a selective post-curing module 104, which is configured to cure the 3D-printed object after the 3D-printed object has been printed.

The processing module 102 typically receives data concerning the 3D-printed object and may be configured to determine a curing toolpath configured to achieve a post-cured 3D-printed object having variable properties along different regions of the 3D-printed object. This may be performed in any number of ways, including for example by incorporating a 3-D scanner 208, shown in FIG. 2, that scans the object to receive data for post-curing. In other embodiments, the data may be loaded onto the processing module 102 directly from a database 204, shown in FIG. 2, that was used to fabricate the 3D-printed object. The model data may include, without limitation, data concerning the structure of the 3D-printed object, as well as desired properties subject of the post-curing process. The desired or target variable properties for the post-curing 3D-printed object may include, without limitation, a variable color shade, a variable opacity, variable flexural strengths, variable modulus, or other variable material properties that may be achieved via post-curing means. For example, variable color shades are ideal for multicolor dental restorations such as crowns and bridges. Similarly, variable opacity may be ideal for multicolor dental restorations such as crowns and bridges. Furthermore, variable material properties such as various flexural strengths and modulus may be ideal for dental appliances such as orthodontic appliances, including—for example and without limiting the scope of the present invention—aligners and retainers as well as occlusal guards and splints. Typically, the processing module 102 controls components of the selective post-curing module 104, which as will be discussed below, is configured to create a post-cured 3D-printed object having the target variable properties.

The selective post-curing module 104 typically includes a selective post-curing chamber 400 (hereinafter, also referred as chamber 400) with a light source configured to generate a powerful laser for the post-curing process. The chamber 400 may include a mounting platform for mounting the 3D-printed object once it comes out of the printing process from the 3D-printing module 106. In exemplary embodiments, the light source may include a projector mounted on a track that is configured to revolve around a mount within the chamber in which the 3D-printed object is mounted. In this way, once the geometry of the 3D-printed object or part that needs to be cured is out or ready from the 3D-printing module 106, the pattern of energy will be projected onto the 3D-printed object using the projector equipped with the adequate wavelengths and energy amounts.

The 3D-printing module 106 may include any number of components such as those that may be necessary or useful for stereolithography additive manufacturing techniques. In exemplary embodiments, a database of the 3D-printing module 106 may communicate with the processing module 102 of the present invention in order to provide the data for the curing toolpath.

Accordingly, in some exemplary embodiments, a system 100 for selectively post-curing a 3D-printed object to attain variable properties may include: a processing module 102 for receiving data concerning the 3D-printed object and determining a curing toolpath configured to achieve a post-cured 3D-printed object having variable properties along different regions of the 3D-printed object; and a selective post-curing module 104, including a chamber with a light source configured to house the 3D-printed object and selectively emitting a curing light onto the 3D-printed object. In some exemplary embodiments, processing module 102 receives data concerning the 3D-printed object, which includes a predetermined curing toolpath configured to achieve a post-cured 3D-printed object having variable properties along different regions of the 3D-printed object. In some exemplary embodiments, a user interface in communication with the module 104 enables a user to select the type of 3D-printed object placed in the curing camber of the 400; the processing module will access data concerning the 3D-printed object based on the user-selection, the data including a predetermined curing toolpath for the 3D-printed object, wherein the toolpath is configured to post-cure the 3D-printed object into a post-cured 3D-printed object having variable properties along different regions of the post-cured 3D-printed object. As will be explained in more detailed below, post-curing the post-cured 3D-printed object with variable properties along different regions of the post-cured 3D-printed object may be achieved by a movable light source assembly inside chamber 400.

In exemplary embodiments, the movable light source assembly may be configured to emit curing light at multiple wavelengths and at variable positions along a movement track about a platform within the chamber 400, such that the movable light source assembly emits curing light at one or more wavelengths onto a 3D-printed object along a predetermined toolpath associated with the 3D-printed object. The wavelength of the curing light emitted onto the object may be variable; as such, a variable energy pattern may be emitted onto the 3D-printed object along the toolpath in accordance with a target physical property at a given position along the toolpath; in this way, the post-cured 3D-printed may have—by way of example and without limitation—a variable color shade, a variable opacity, a variable flexural strength, a variable elasticity, a variable modulus, or other variable material properties along the predetermined toolpath.

Figure 2A:
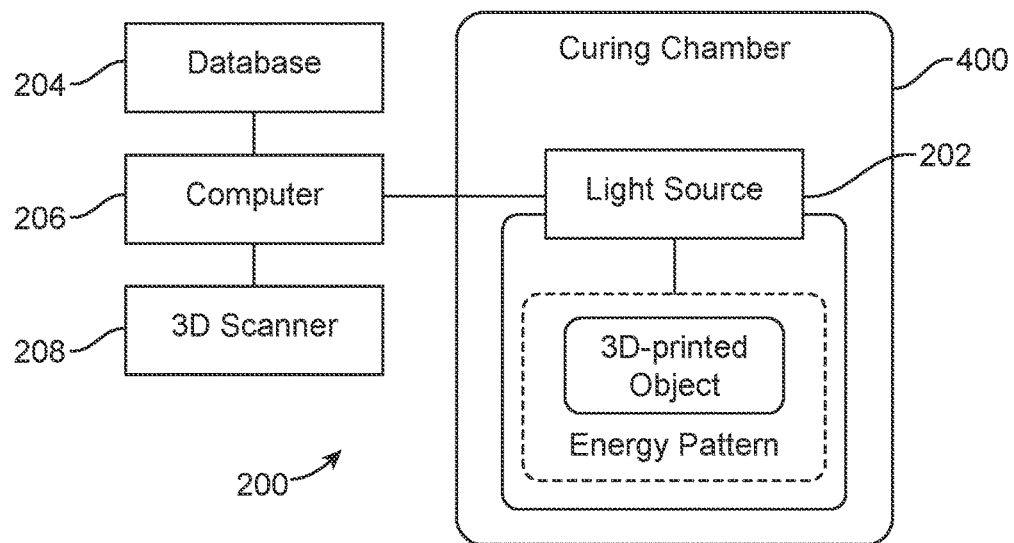
FIG. 2A exemplarily illustrates a block diagram of a system for selectively post-curing a three-dimensional object to attain variable properties in communication with the database and 3-D scanner, according to an embodiment of the present invention.

Turning now to the next figure, FIG. 2A illustrates an exemplary system 200 in accordance with some embodiments of the present invention. More specifically, FIG. 2A depicts system 200, which generally includes a selective post-curing chamber 400 adapted to receive a 3D-printed object, a post-curing light source or movable light source assembly 202 (that may include, for example an LED module) housed in the chamber 400, and a computer 206 coupled to the movable light source assembly 202 including one or more executable instructions for selectively emitting a curing light onto the 3D-printed object along a predetermined curing toolpath based on data of the 3D-printed object.

The chamber 400 may be any suitable curing chamber for curing 3D-printed objects. The chamber 400 is typically adapted to house a 3D-printed object that can be secured to an interior of the chamber 400 via a mounting platform or mount suitable for holding the 3D-object in place during the curing process. In some exemplary embodiments, a track or path may be provided around the mounting platform for the 3D-printed object, in order to facilitate a rotation or revolution of the movable light source assembly 202 around the 3D-printed object during the post-curing process.

The computer 206 is generally coupled to or in communication with the movable light source assembly 202 and configured with one or more executable instructions for selectively emitting a curing light onto the 3D-printed object along a predetermined curing toolpath based on data of the 3D-printed object, wherein curing the 3D-printed object along the predetermined curing toolpath generates variable properties along different regions of the 3D-printed object.

To obtain the data, as mentioned above, the computer 206 may be coupled to or in communication with a database 204, such as a database of a 3D-printing module, or alternatively, or optionally, the computer 206 may be coupled to a 3D scanner 208 that implements 3D scanning technologies in order to derive data concerning the 3D-printed object.

In exemplary embodiments, the computer 206 includes one or more executable instructions for: receiving data concerning a 3D-printed object; determining a curing toolpath configured to achieve a post-cured 3D-printed object having variable properties along different regions of the 3D-printed object; and selectively emitting a curing light onto the 3D-printed object along the curing toolpath, wherein curing the 3D-printed object along the curing toolpath generates the variable properties along the different regions of the 3D-printed object. In some exemplary embodiments, computer 206 includes a user interface (i.e., a keyboard, a touch interface, a keypad, etc.) that enables a user to select the type of 3D-printed object placed in the curing camber of the 400; the computer will access data concerning the 3D-printed object (i.e., from scanner 208 or database 204) based on the user-selection, the data including a predetermined curing toolpath for the 3D-printed object, wherein the toolpath is configured to post-cure the 3D-printed object into a post-cured 3D-printed object having variable properties along different regions of the post-cured 3D-printed object.

Figure 2B:
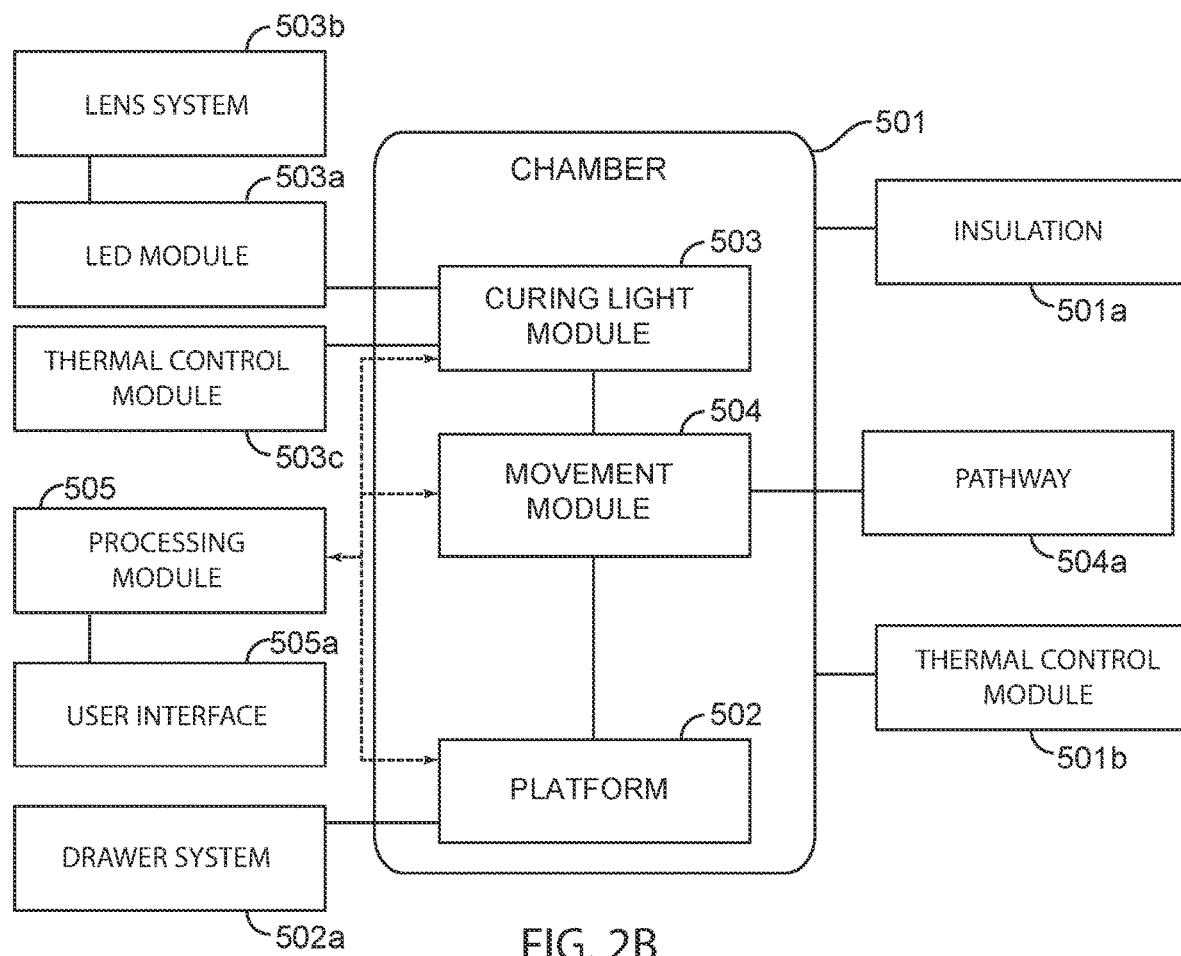
FIG. 2B exemplarily illustrates a block diagram of a chamber for selectively post-curing a three-dimensional object, according to an embodiment of the present invention.

FIG. 2B exemplarily illustrates a block diagram of a chamber for selectively post-curing a three-dimensional object, according to an embodiment of the present invention. More specifically, FIG. 2B depicts exemplary system 500 for system for selectively post-curing a 3D-printed object to attain one or more variable properties; system 500 may include the same general components of system 200 as illustrated in FIG. 2A, but may particularly include: a chamber 501; a platform 502 arranged within the chamber 501 for supporting at least one 3D-printed object thereon; a curing light module 503 such as a light source assembly arranged within the chamber 501 and configured to emit one or more wavelengths of a curing light onto the 3D-printed object; a movement module 504 configured to move the curing light module 503 or the platform 502 in order to selectively expose different regions of the 3D-printed object to the curing light along a predetermined curing toolpath of the 3D-printed object; and a processing module 505, which is in communication with the curing light module 503 and the movement module 504, the processing module 505 including one or more executable instructions configured to: receive a user input, via a user interface 505*a* coupled to the processing module 505, the user input concerning the 3D-printed object and indicative of the predetermined curing toolpath for post-curing the 3D-printed object; move the curing light module 503 or the platform 502 according to the curing toolpath; and emit the curing light onto the 3D-printed object along the curing toolpath to create a post-cured 3D-printed object.

Chamber 501 may be constructed of various materials, although typically a construction employs a design that provides insulation 501*a*, such as for example, insulation layers of insulating materials, as well as a multiple encasing construction that facilitates conservation of a desired temperature within the chamber but prevents excessive heat exposure to an outside of the chamber so as to protect the user. In exemplary embodiments, the chamber comprises an interior surface finish adapted to maximize a reflectance for ultraviolet light. In exemplary embodiments, in addition to insultation 501*a*, chamber 501 may include a thermal control module 501*b* such as a heating device that may be situated below the platform 502 to expose the 3D-printed objects inside chamber 501 to a desired temperature suitable for the post-curing process.

Platform 502 may be any platform suitable for exposure to curing light from curing light module 503, such as ultraviolet light, and suitable for supporting one or more (and preferably although not necessarily) multiple 3D-printed objects within the chamber 501. In exemplary embodiments, the platform may be stationary when chamber 501 is active but may be movable to facilitate removal and insertion of the objects into and out of the chamber. In some exemplary embodiments, the platform 502 may be a movable platform such as a rotating platform—for example a turntable platform. In some exemplary embodiments, the platform may be a movable platform that is capable of tilting or performing other movements in order to facilitate adequate exposure of the 3D-printed objects to the curing light from the curing light module 503. In some exemplary embodiments, platform 502 is a simple stationary platform situated inside the chamber 501 in a manner such as to adequately expose a 3D-printed objects to a curing light from the curing light module 503. In exemplary embodiments, in order to facilitate movement of the platform in and outside of the chamber 501, a drawer system 502*a* may be employed; such drawer system is discussed below with reference to other figures. In exemplary embodiments, the platform 502 includes a surface adapted to receive the 3D-printed object, the surface including: a mesh, or a material made of at least one of an ultraviolet C transparent material and an ultraviolet A transparent material.

Curing light module 503 may be any light source or light source assembly equipped with a light source suitable for post-curing 3D-printed objects. In some exemplary embodiments, the light source assembly includes at least one light source disposed above the platform and at least one light source disposed below the platform to maximize exposure to various portions of the 3D-printed object. In some exemplary embodiments, the curing light module 503 comprises a Light Emitting Diode (LED) module 503*a* for emitting the one or more wavelengths of the curing light onto the 3D-printed object. LED module 503*a* may be comprised of multiple LED panels, and in some exemplary embodiments, LED module 503*a* includes at least one LED panel disposed above the platform 502 and at least one LED panel disposed below the platform 502. In order to control a desired temperature inside the chamber 501 and also to keep optimal performance of LED module 503*a*, in some exemplary embodiments, LED module 503*a* or curing light module 503 may include a thermal control module 503*c* built into a structure or light assembly of the module; this may include a fan system to actively control a temperature of the chamber and also of light source components of the curing light module 503. In some exemplary embodiments, the curing light module 503 comprises a lens system for volume coverage of the 3D printed object, the lens system including one or more convex lenses adapted to move relative to the light source assembly for changing a volume coverage area of the 3D-printed object.

Movement module 504 may be any set of components that are suitable for facilitating movement of curing light module 503 or platform 502. For example, and without limiting the scope of the present invention, movement module 504 may comprise a movement system for platform 501, such as a motor, actuator or device that moves platform 502. In some exemplary embodiments, a motor of the movement module may be configured to rotate a turntable coupled to the platform. In some exemplary embodiments, a motor, actuator or device may be configured to raise and lower the platform 502. In some exemplary embodiments, movement module 504 may comprise a movement system for curing light module 503, such as a motor, actuator or device that moves one or more devices of the curing light module 503; in some exemplary embodiments, this may involve a motor coupled to a pathway 504a, such as a track, including a linear track, that enables movement of a light assembly along the pathway inside the chamber. As will be discussed in more detail below, other configurations are also possible—for example, and without limiting the scope of the present invention—movement module 504 may comprise of motors, actuators or devices that move both platform 502 and curing light module 503. In exemplary embodiments, the movement module is adapted to facilitate at least one of continuous motion, motion having multiple stationary points, or bidirectional motion of the curing light module 503 or the platform 502. In some exemplary embodiments, a position sensor may be included in the movement module for determining a position of a light source of the curing light module 503 or the platform 502.

Processing module 505 may be any suitable computing device that is configurable or programmable with one or more executable instructions configured to activate the various components of chamber 501. Generally, processing module 505 is configured to at least receive a user input, via a user interface 505a coupled to the processing module 505, the user input concerning the 3D-printed object and indicative of the predetermined curing toolpath for post-curing the 3D-printed object; move the curing light module 503 or the platform 502 according to the curing toolpath; and emit the curing light onto the 3D-printed object along the curing toolpath to create a post-cured 3D-printed object. In some exemplary embodiments, a database in communication with the processing module that stores information about the 3D-printed object.

Figure 3:
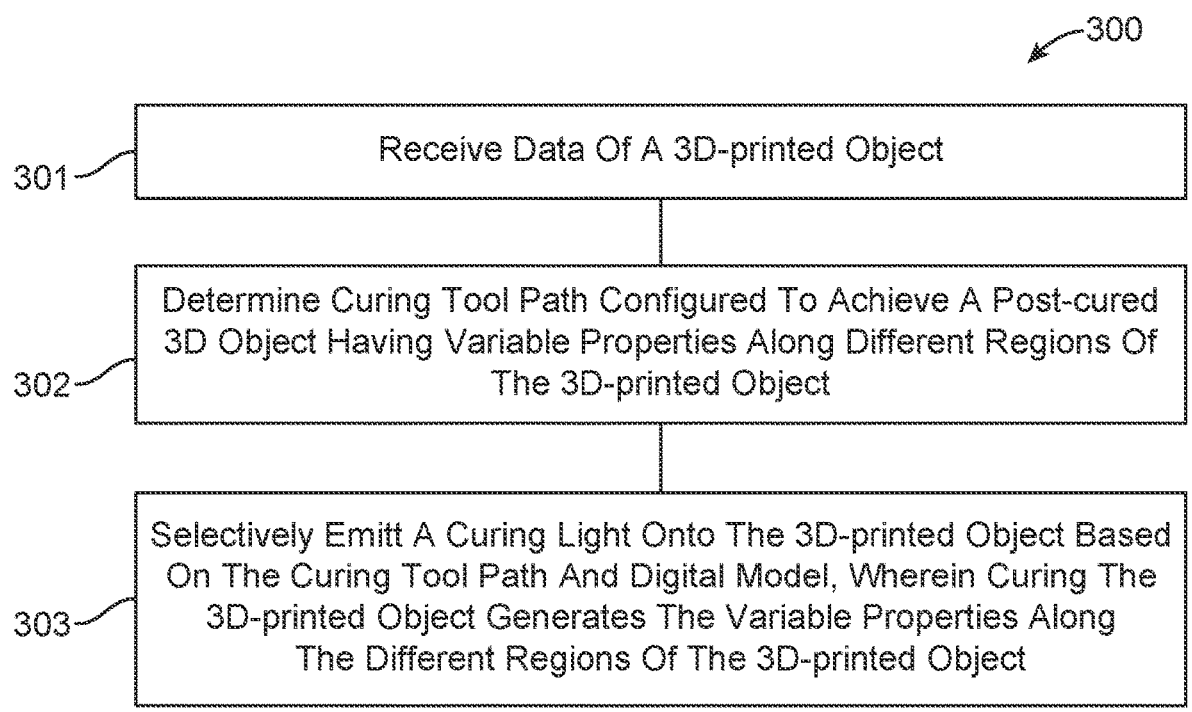
FIG. 3 exemplarily illustrates a method for selectively post-curing a three-dimensional object to attain variable properties, according to practice of some embodiments of the present invention.

Turning now to the next figure, FIG. 3 depicts a flow chart of a method in accordance with some exemplary embodiments of the present invention. More specifically, FIG. 3 depicts method 300 for selectively post-curing a 3D-printed object to attain variable properties. Although presented in a particular sequence, method 300 may be achieved in alternative sequences with optional steps, without deviating from or limiting the scope of the present invention. Generally, method 300 comprises the steps of: 301 receiving data concerning a 3D-printed object; 302 determining a curing toolpath configured to achieve a post-cured 3D-printed object having variable properties along different regions of the post-cured 3D-printed object; and 303 selectively emitting a curing light onto the 3D-printed object along the curing toolpath, wherein curing the 3D-printed object along the curing toolpath generates the variable properties along the different regions of the 3D-printed object.

In step 301, data concerning a 3D-printed object may be received. This may include receiving the data from a database or receiving the data from a 3D-scanner coupled to a system in accordance with the present invention. The data may be compiled by generating a digital model of the 3D-printed object that divides the 3D-printed object as a number of volumes, wherein each of the divided volumes include a corresponding curing position along the toolpath.

In step 302, a curing toolpath configured to achieve a post-cured 3D-printed object having variable properties along different regions of the 3D-printed object may be determined. In exemplary embodiments, this may be performed by the computer of the system. However, this step may be performed externally to the system and the system may instead be configured to receive the data, which includes the desired curing toolpath.

In step 303, the computer communicates with the light source and a curing light is selectively emitted onto the 3D-printed object in accordance with the curing toolpath and the digital model, wherein curing the 3D-printed object along the curing toolpath generates the variable properties along the different regions of the 3D-printed object.

In some exemplary embodiments, a method for selectively post-curing a 3D-printed object to attain variable properties may include the steps of: mounting a 3D-printed object in a selective post-curing chamber including a post-curing light source configured to emit a curing light onto the 3D-printed object; receiving data of the 3D-printed object concerning a curing toolpath and digital model of three-dimensional printed object; and selectively emitting a curing light onto the 3D-printed object along the curing toolpath based on the model data, wherein curing the 3D-printed object along the curing toolpath generates variable properties along different regions of the 3D-printed object.

Figure 4A:
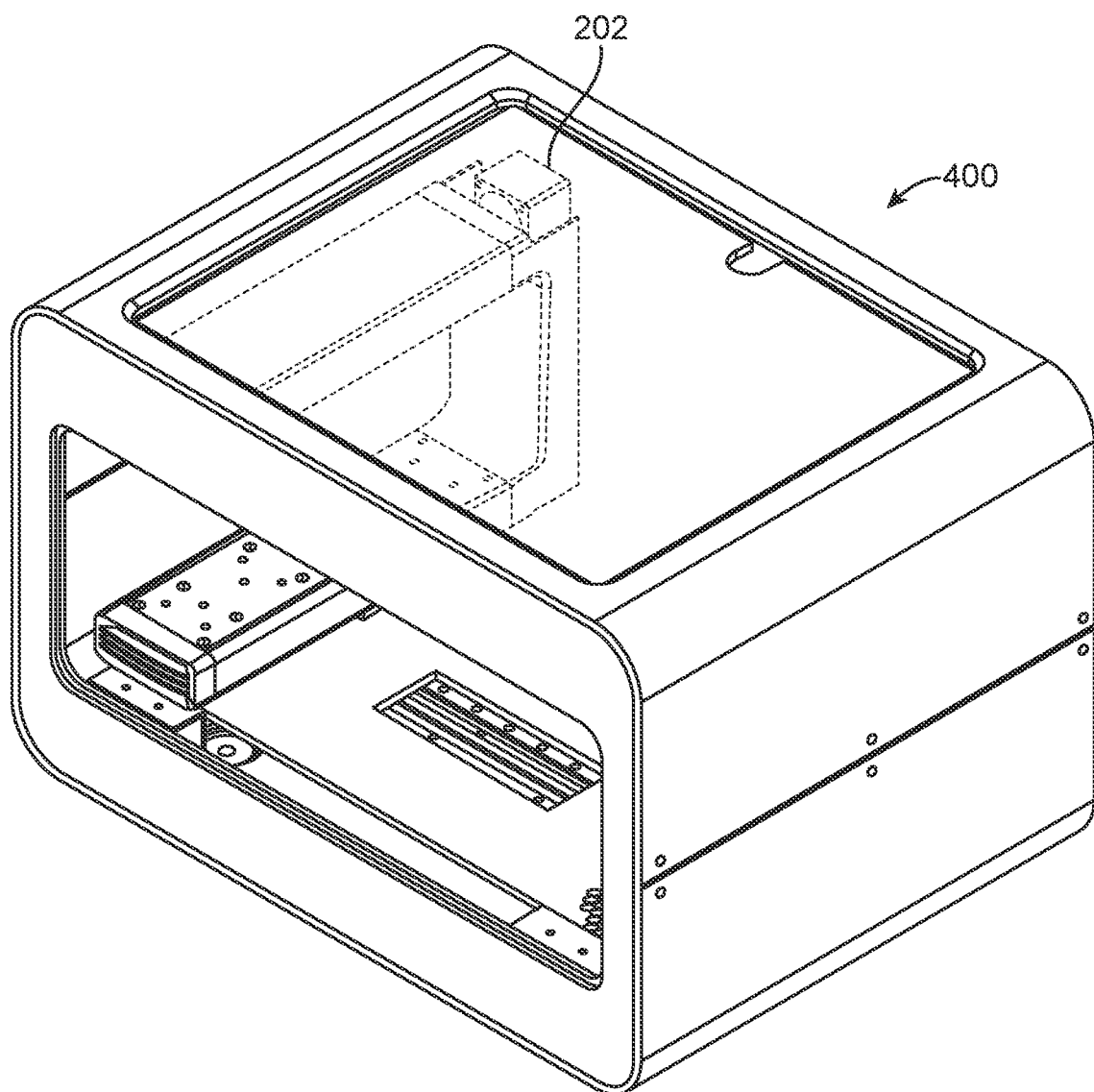
FIG. 4A exemplarily illustrates a perspective view of a post-curing chamber, according to an embodiment of the present invention.
Figure 4B:
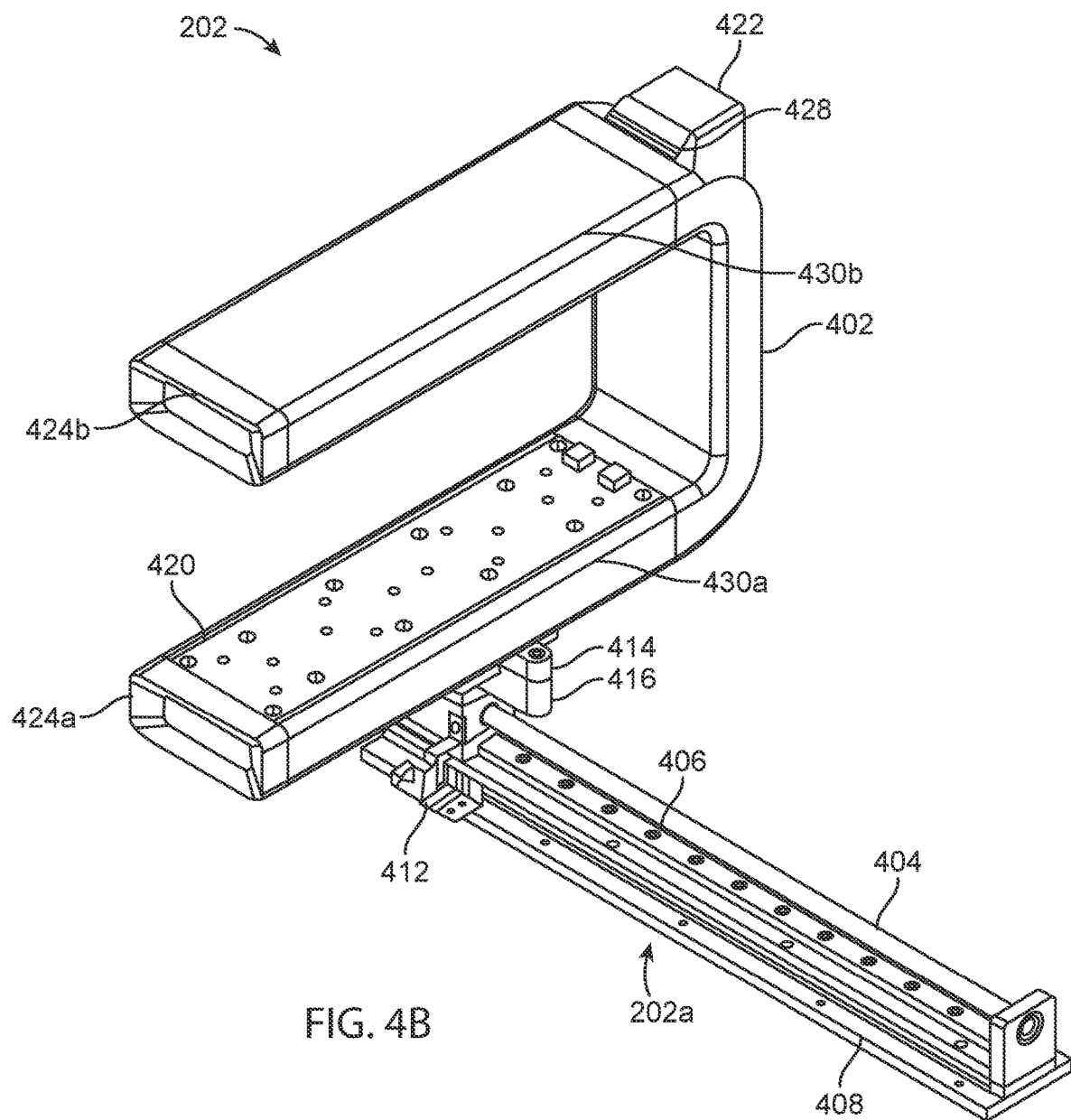
FIG. 4B exemplarily illustrates a perspective view of a motion system and a light source assembly of the post-curing chamber, according to an embodiment of the present invention.
Figure 4E:
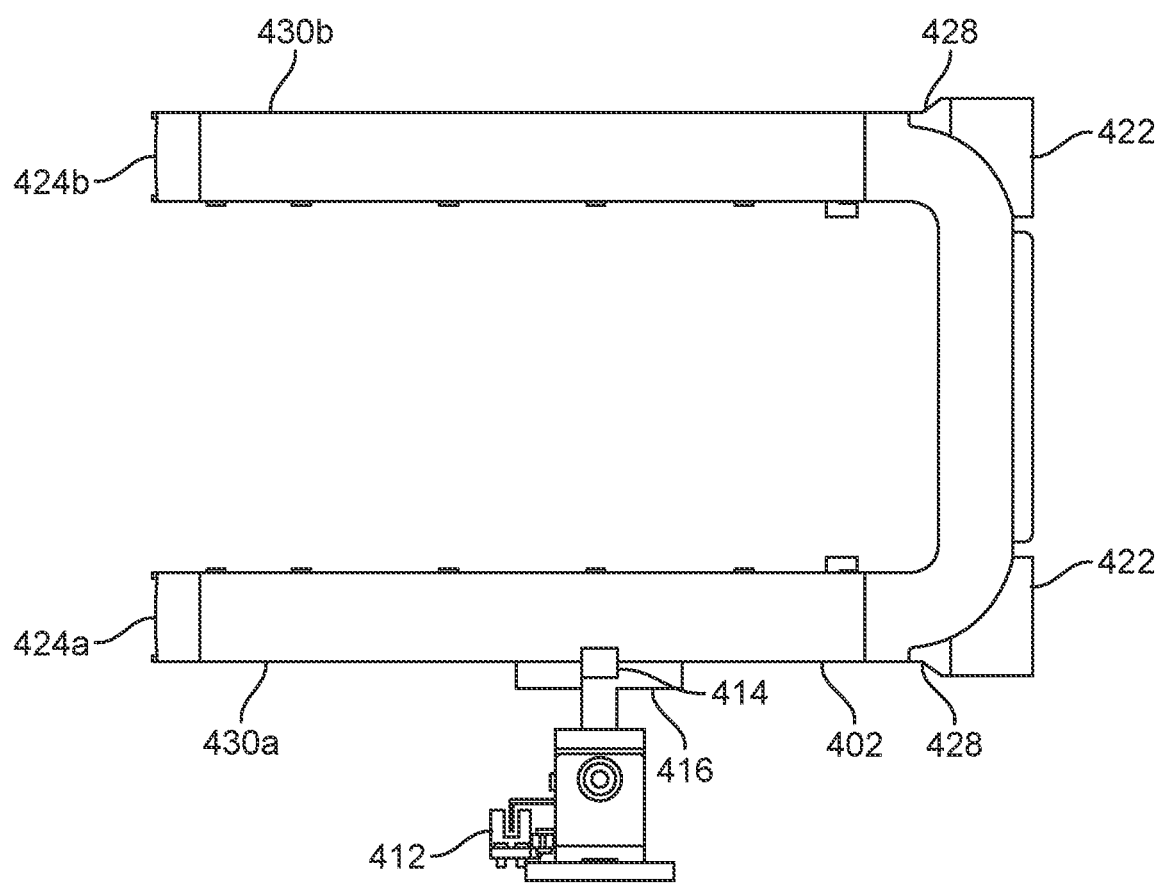
FIG. 4E exemplarily illustrates a side view of a motion system and a light source assembly of the post-curing chamber, according to an embodiment of the present invention.

FIG. 4A exemplarily illustrates a perspective view of the chamber 400, according to an embodiment of the present invention. The chamber 400 houses a post curing light source or movable light source assembly and a motion system, which will be discussed below with reference to other figures. FIG. 4B through FIG. 4E illustrate different views of the movable light source assembly that sits on a motion system within chamber 400 in accordance with an exemplary embodiment of the present invention. The post curing system is configured to provide maximum irradiation, or volume coverage, of UVA light on the 3D-printed part surface by using the motion system.

More specifically, FIG. 4A depicts movable light source assembly 202 situated inside chamber 400. FIG. 4B-FIG. 4E depicts the movable light source assembly 202 in isometric view with several components: a bottom LED module including a bottom panel casing 430a and a top LED module including a top panel casing 430b, an LED casing connecting bracket 402, and a motion system 202a, which in some embodiments is a linear motion system.

In some exemplary embodiments, the movable light source assembly 202 may be coupled to linear motion system 202a by way of a mounting bracket 414 coupled between the movable light source assembly 202 and linear motion system 202a, and a connecting bracket 416 that couples the mounting bracket 414 to a portion of the mounting bracket 414 such as a track (or for example, a lead screw 404). Linear motion system 202a may comprise of a high accuracy stepper motor 410 (see FIG. 4D, for example), a lead screw 404, a linear guide 406, a linear guide mounting plate 408 and a position sensor 412. The high-power LED modules may be held together by the bracket 402, which is connected to the motion system 202a for linear guidance—or so hat the movable light source assembly 202 may be positioned along a track of the motion system 202a. A cable track may be used to enable one dimensional freedom for the power cables.

The LED module may include uniform light intensity along the X axis and the linear motion system creates motion along the Y axis to increase the volume coverage. The motion can be either a continuous motion or have multiple stationary points. The length of the movement may be divided into different zones according to the number of models present for curing and, in some embodiments, may be indicated on a mounting platform such as a tray holder 444, shown in FIG. 9C, for a user's reference.

In another exemplary embodiment of the present invention, the post curing system may contain a movement system for volume coverage achieved by linear uniaxial motion in the X or Y axis. The volume coverage may alternatively be achieved by implementing a rotational motion. The LED module and bracket system are connected to the motor system to create rotational motion. The LEDs uniformly irradiate the radial direction, and the rotational motion covers the entire platform area. Alternatively, volume coverage may be achieved by fixed light source and a moving platform. For the linear movement system, it may be achieved by moving the platform in the X or Y axis. The volume coverage may also be achieved by implementing a turntable, where the light source is fixed but the platform moves. Another alternative for volume coverage is bidirectional motion. This involves combining motion in the X and Y axis.

In another exemplary embodiment of the present invention, the volume coverage may alternatively be achieved by tilting a light source. The system may include a high optical power light source which is rotated about an axis, which is either on the light source or away from it. The distance from the axis determines the optical output required from the panel.

In another exemplary embodiment of the present invention, a desirable volume coverage may be achieved by use of a convex lens system. The system may include a high-power LED source accompanied by a convex lens. The optical output from the high-power LED source passes through the convex lens. The lens is moved closer or further away from the source to change the coverage area. In another exemplary embodiment, the light source is moved relative to the lens.

In exemplary embodiments, the LED module or modules may be adapted to using multiple wavelengths of light in different combinations to give the 3D-printed objects varying desired physical properties. For example, and without limiting the scope of the present invention, multiple curing wavelength may involve UVA+UVC, or other combinations to selectively enhance the properties of the 3D-printed parts being cured within chamber 400.

FIG. 5 exemplarily illustrates an exploded view of the light source assembly, according to an embodiment of the present invention. The light source assembly consists of a top LED panel casing 430*b* and bottom LED panel casing 430*a*, which house LED panels 418 and 420, respectively, including heat sinks 426. The bottom LED panel casing 430*a* houses the bottom LED panel 420 and the top LED panel casing 430*b* houses the top LED panel 418. Each casing is designed to accommodate the heat sink 426 between the wall of the casing (430*a*, 430*b*) and respective heat sink 426 which ensures that an airflow is directed through the heat sink by way of a fan system (for example, and without limitation, fans 422) that facilitates the airflow. The transition from the circular cross section of the fan to the rectangular cross section of the duct is enabled using a fan mounting spacer 428 which may be designed with smooth surfaces and gradual transition and the fan 422 may be centered with the duct to reduce pressure drop, eliminating vortex formation and removing zones for pressure drops. Openings at each terminal end of each casing may form a duct that may include caps (424*a*, 424*b*) to prevent exposure to the heat sink. Each cap (424*a*, 424*b*) may include an opening on the sides and perforations on the top to further facilitate airflow. The total area of openings through these is equal to the cross-sectional area of the duct, to reduce pressure drop. The fan 422 orientation can be either a high static pressure fan, or multiple fans in series to generate high static pressure than single fan at similar flow rate of single fan or multiple fans in parallel to generate same static pressure as single fan but with a higher flow rate.

FIG. 6 exemplarily illustrates an exploded view of an LED module (in this case the top LED module that is secured or housed within top panel casing 430*b*) in accordance with the present invention, which employs a thermal management system, as will be discussed further below. The LED module includes a plurality of LEDs disposed on a surface of the LED panel 418, thermal pad 432, and a heat sink 426. A bottom LED module may include a similar mirrored configurations of LED panel, thermal pad, and a heat sink.

Because some of the photopolymers to be post cured within chamber 400 may require an ambient temperature of 60 Celsius, air inside the chamber may need to be heated. On the other hand, the UVA LEDs typically have an operating efficiency of 59% and may generate waste heat of 48 Watt for the top panel and 19 Watt for the bottom panel, with a potential maximum junction temperature for a UVA LED 90 Celsius and for UVC LED 100 Celsius. Thus, there is also a need to cool down the LED panel. To address these factors, in exemplary embodiments, a cooling system for LEDs may include several components: heat sink 426, thermal pad 432, and cooling fan 422—all housed within each of the LED panel casing 430 that facilitates air circulation between the top and bottom LED panels. In some exemplary embodiments, the size of the top LED panel 418 and the bottom LED panel 420 may be 224 mm by 60 mm. A single layer aluminum PCB may be used to make the LED panel. This helps decrease the thermal resistance from the board and provides a large surface area for the heat to transfer. The ambient temperature in the chamber 400 may be preferably at 60 Celsius and the LED junction temperature may be preferably below 80 Celsius, which gives a delta T of 20° C. The heat output from the panel may be 48 Watt, hence the maximum thermal resistance for the system is preferably below 0.42 C/W, which is calculated by using Formula (7) and Formula (8):

$$\text{Thermal resistance} = \text{Desired delta } T \div \text{Heat Output} \quad \text{(Formula (7))},$$

$$Q = hc\, A(Ts - Ta) \quad \text{(Formula (8))},$$

where Q is the rate of heat transfer; hc is the convection heat transfer coefficient; A is surface area for heat transfer; Ts is the surface temperature of heat sink; and Ta is the air temperature.

In exemplary embodiments, chamber 400 may employ specific materials to maximize a reflectance for the UV light output from movable light source assembly 202. For example, and without limiting the scope of the present invention, the materials may include Aluminum, Stainless Steel or Teflon (Porex). In some exemplary embodiments, chamber 400 may employ a surface finish to maximize the reflection. For example, and without limiting the scope of the present invention, the surface finish may include enhanced Aluminum, and or titanium oxide coating. Of course, other materials and or combination of materials may be employed in order to improve or maximize a desired reflectance for the UV light output from movable light source assembly 202. Accordingly, in exemplary embodiments, camber 400 comprises a surface finish to maximize the reflection.

Figure 7:
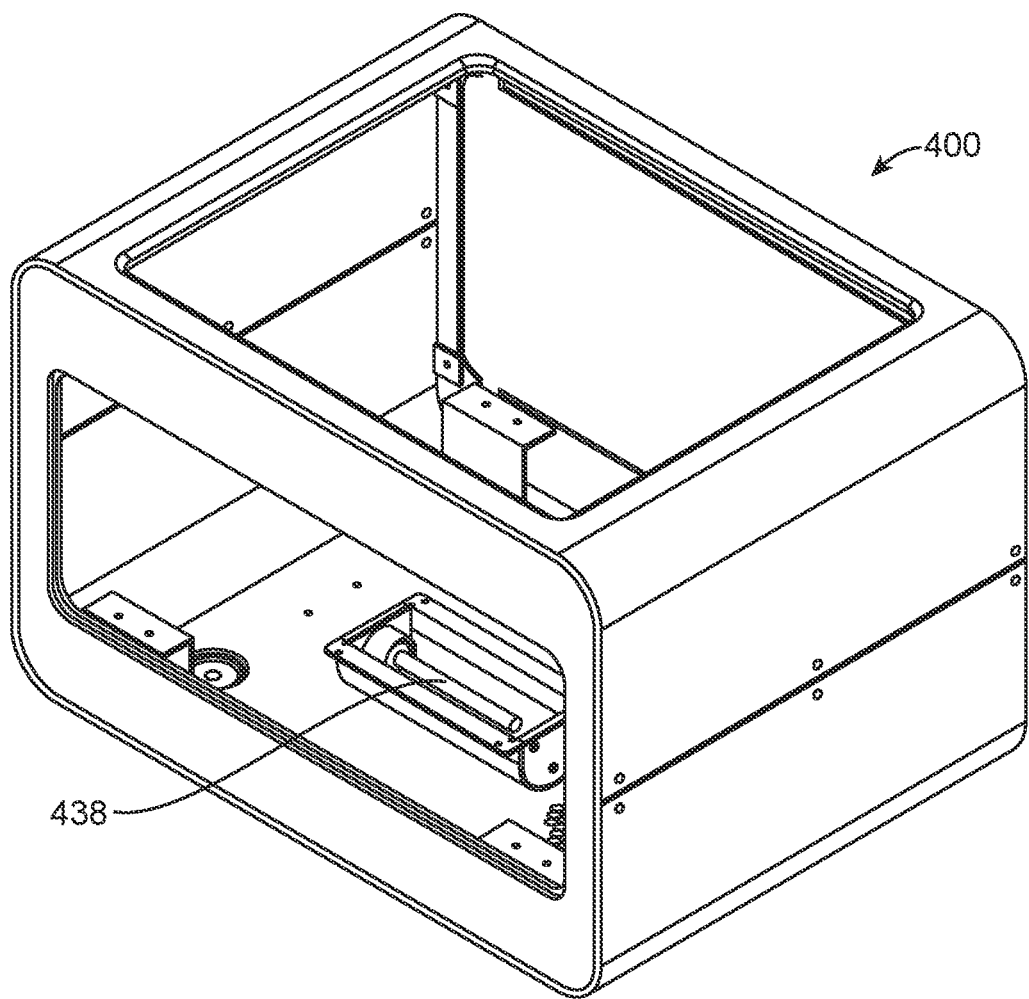
FIG. 7 exemplarily illustrates a heating element arranged in the post-curing chamber, according to an embodiment of the present invention.

FIG. 7 exemplarily illustrates a heating device arranged in the chamber 400, according to an embodiment of the present invention. FIG. 8 exemplarily illustrates an exploded view of the heating device of the chamber 400, according to an embodiment of the present invention, which reaches a desirable temperature for curing certain photopolymers.

The heating device 438 includes a heating element 438*a* configured to transfer heat energy to the air in the least amount of time. Heating device 438 may be an electric heater employing a heating element that outputs heat distributed in two parts. The first part may be responsible for heating the heating element and the second part may be responsible for transferring heat to the air inside the chamber. In exemplary embodiments, heating element 438*a* may be adapted to have minimum thermal lag, i.e., reaching an operating temperature in minimum amount of time. The thermal lag depends on the mass and the specific heat of the material used in heating device 438. In some exemplary embodiments, an outer shell may be made of stainless steel which under high temperature forms a layer of Cr2O3 that resists further oxidation of the heating element. In some exemplary embodiments, a resistive wire may be used; for example, a nichrome wire capable of withstanding high temperature may be covered by a sheath of MgO that acts as an electrical insulator. In some embodiments, the heating device may use metal ceramic elements. In some embodiments, heating element 438*a* is a bare nichrome wire. In some embodiments, heating element 438*a* is a nichrome wire in a metal casing. In some embodiments, heating device 438 includes resistive nichrome wires infused in a ceramic casing. The heating element preferably has very low oxidation; to these ends, a ceramic surface may be employed.

FIG. 8 illustrates an exemplary embodiment of the present invention in which the heating element 438*a* attains high surface temperature, in excess of 418 Celsius. The heating element 438*a* needs to be isolated from the user because of the high temperature. The heater housing 436 has been designed to contain and redirect the airflow into the chamber 400. The housing has an insulation (440 and 442) wrap on the exterior. One side of the heater housing has a threaded mounting hole. The heater is screwed into the hole. The side panels 434 of the heater housing has tabs 472 on its sides which fits into the grooves 474 in the heater housing 436 disposed at the bottom portion. The side panels 434 have spacers to ensure that the side insulation 440 does not get pressed during the assembly. The heater housing is positioned on the bottom of the chamber 400 to facilitate natural convection. The heater housing is covered by protective mesh, the size of mesh is to maximize the airflow. In some exemplary embodiments, a sheet metal may be used to offer little resistance to transfer of heat from inside the product to outside.

Figure 9A:
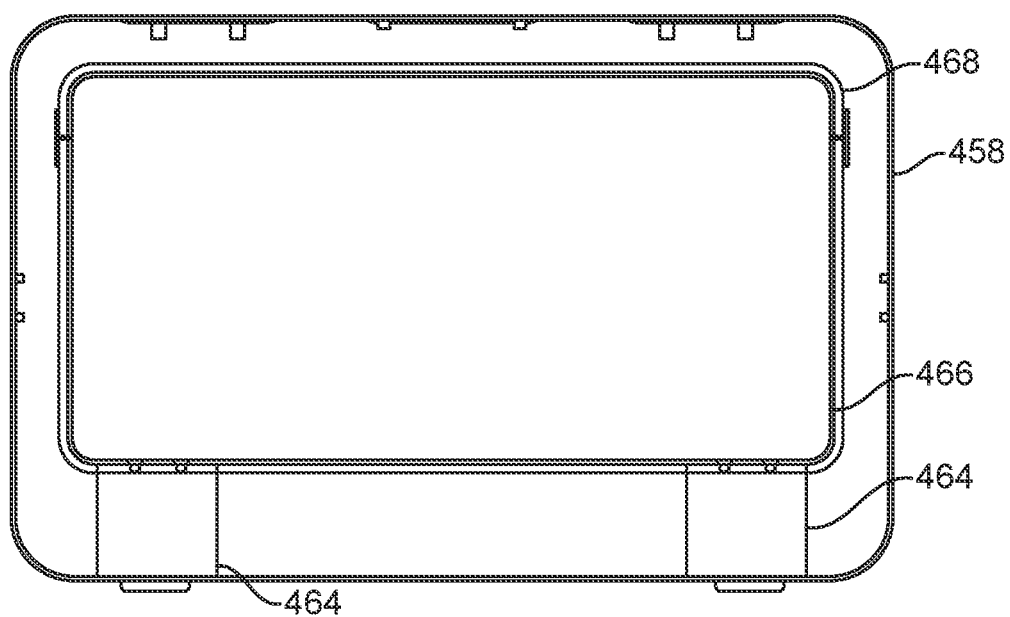
FIG. 9A exemplarily illustrates a front view of the post curing chamber, according to an embodiment of the present invention.
Figure 9B:
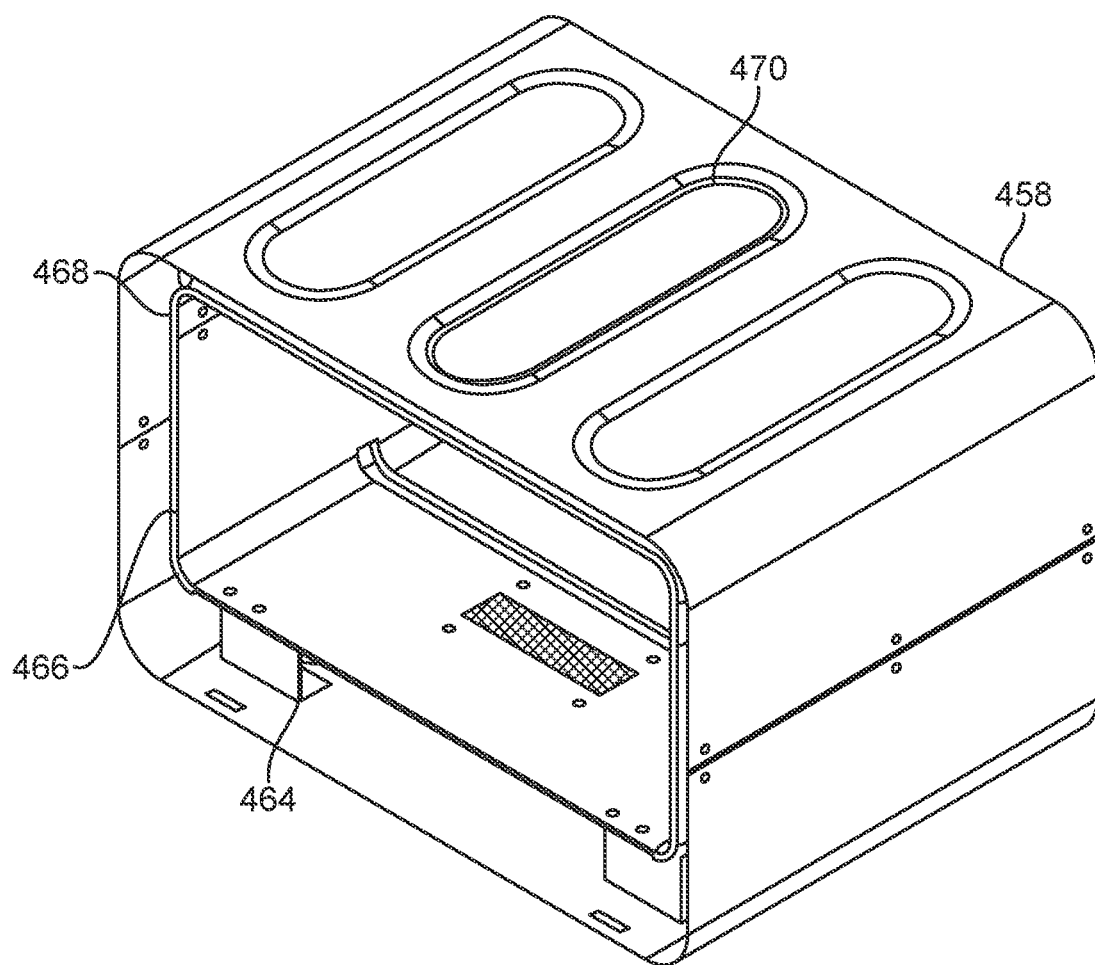
FIG. 9B exemplarily illustrates a perspective view of the post curing chamber, according to an embodiment of the present invention.
Figure 9C:
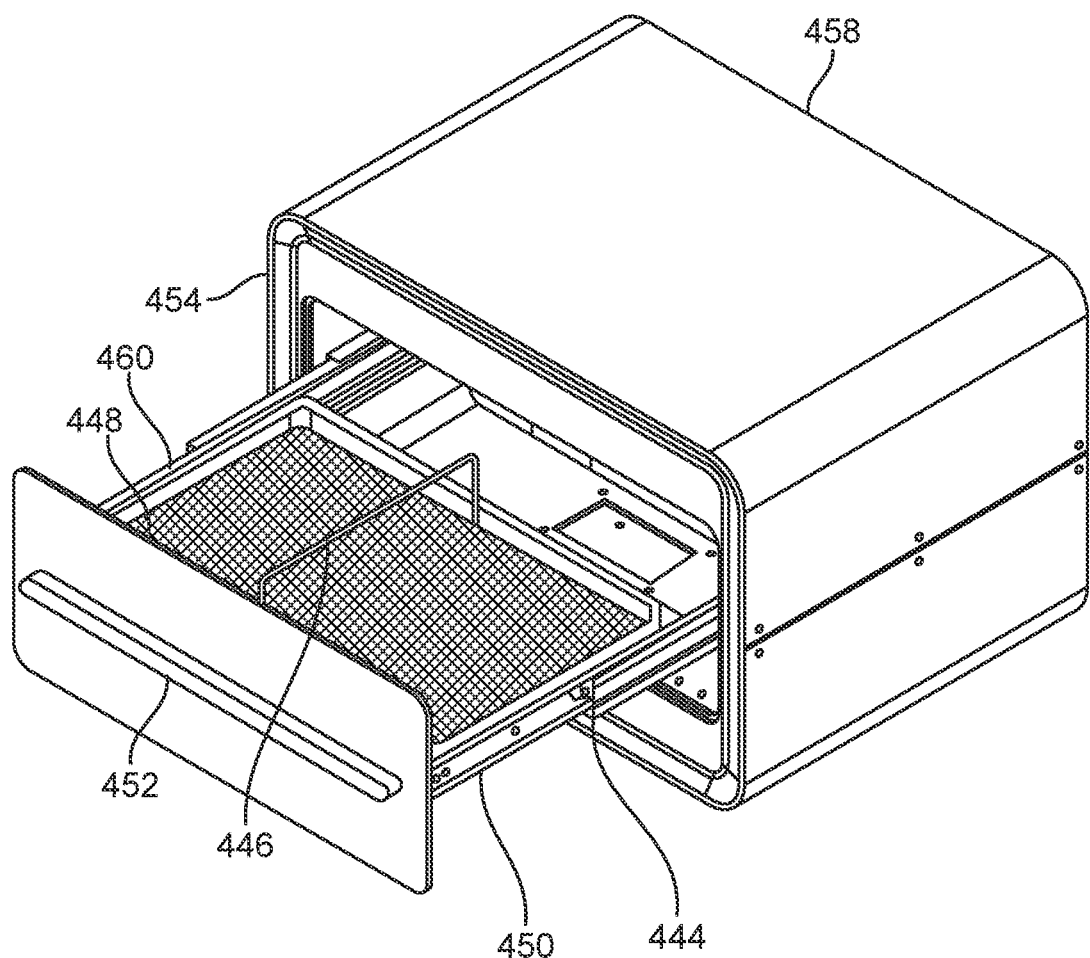
FIG. 9C exemplarily illustrates a perspective view of the post curing chamber and the tray system, according to an embodiment of the present invention.
Figure 9D:
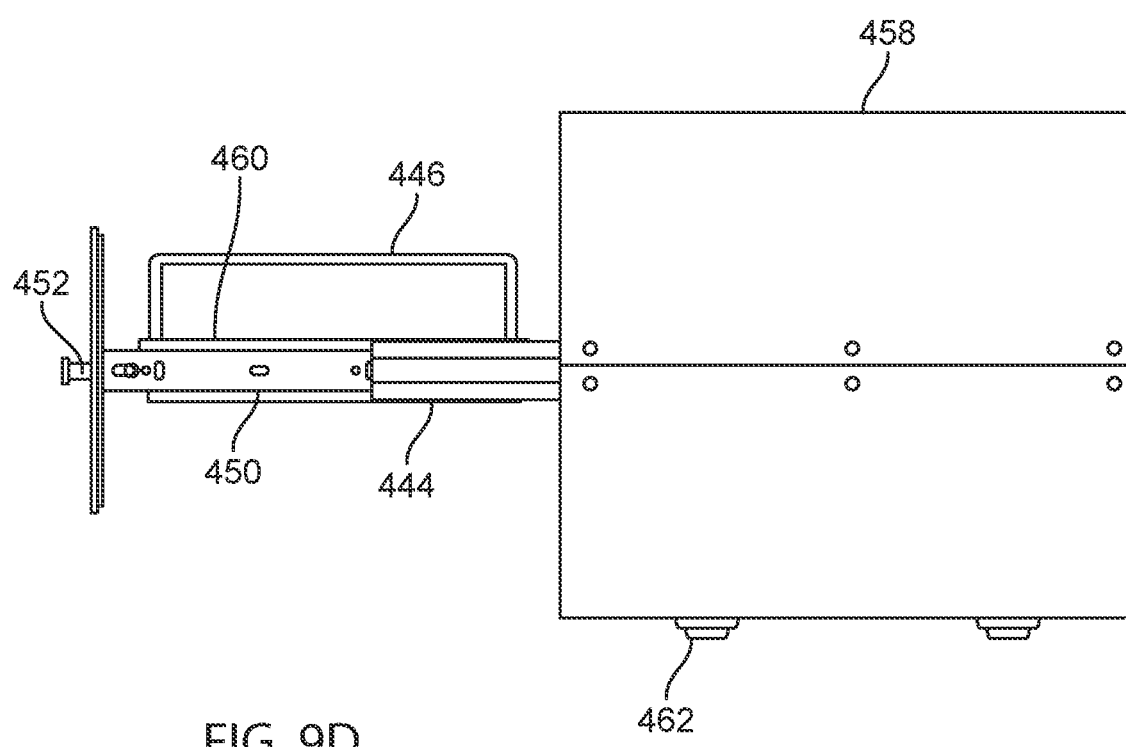
FIG. 9D exemplarily illustrates a side view of the post curing chamber and tray system, according to an embodiment of the present invention.
Figure 9E:
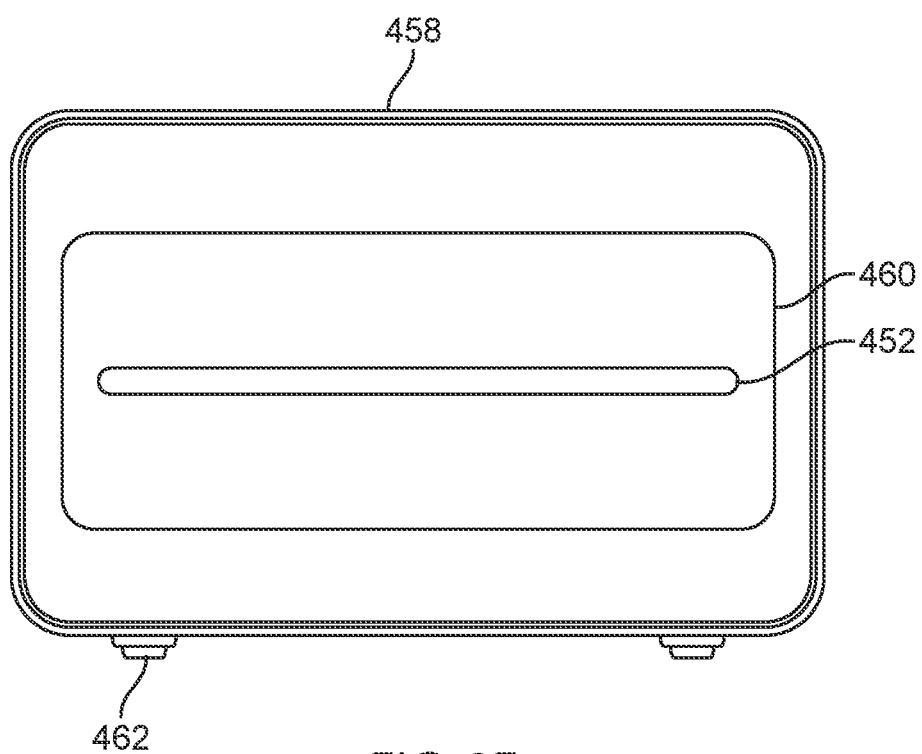
FIG. 9E exemplarily illustrates a front view of the post curing chamber, according to an embodiment of the present invention.
Figure 9F:
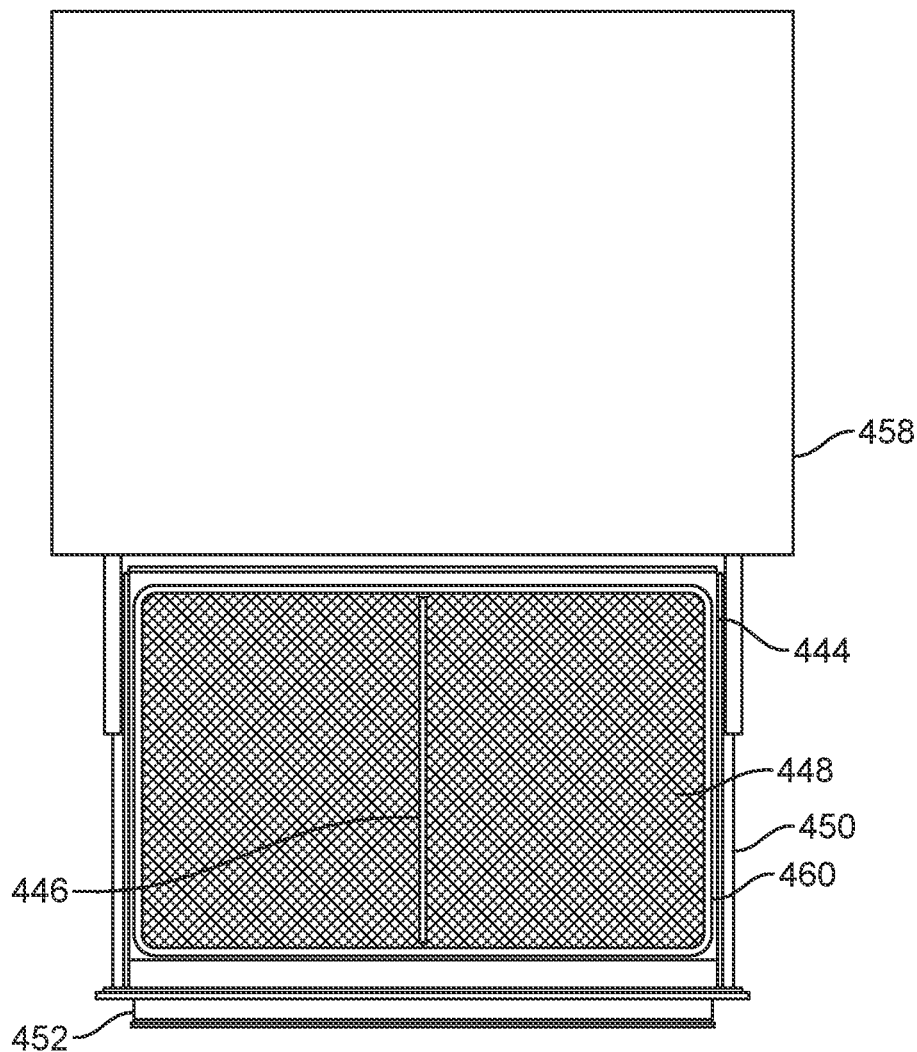
FIG. 9F exemplarily illustrates a top view of the post curing chamber and tray system, according to an embodiment of the present invention.

Turning now to the next set of figures, FIG. 9A through FIG. 9G illustrate perspective views of a post curing system in accordance with an exemplary embodiment of the present invention. More specifically, FIG. 9A and FIG. 9B show a front view and an isometric view, respectively, of an exemplary embodiment of a post curing system. Due to the large surface area, the chamber acts like a heat sink and dissipates heat away. To further reduce heat waste, a layer of insulation 468 may be added to the outer wall of the inner enclosure 466 (see FIG. 9A-9B, for example). The insulation layer 468 may be characterized by an R value which describes the temperature difference across the insulation for a unit heat flux. The requirement for the chamber may be that the external enclosure temperature stays below 37 Celsius, the body temperature. Another attribute required of the insulation may be to have a flame rating of 0 or 1 according to NFPA.

As the chamber heats up air to higher temperatures, the enclosure may become hot and dangerous to handle. To solve this issue, the chamber may employ two sections. An inner section formed by inner enclosure 466 that encloses the LED module and the heating device; this section heats up during the operation to a temperature of 60 Celsius. And an outer section formed by an outer enclosure 458 may include an insulation material to contain the heat; the insulation material selected has R value such that the temperature on the outer chamber 458 is reduced to below 37 Celsius, which is the body temperature. This prevents exposure to hot bodies for the user. The inner enclosure 466 may be coupled to the outer enclosure 458 by way of one or more supports 464 that secure the inner enclosure within an interior region of the outer enclosure 458, leaving a space between the outer enclosure 458 and inner enclosure 466. As may be appreciated from the view of FIG. 9B, the outer enclosure 458 may optionally include one or more LCD cutouts 470 disposed over the top surface of the outer enclosure 458 for displaying one or more indication lights to the user indicative of a status of the device or post-curing process. In some exemplary embodiments, the top surface of outer enclosure 458 is smooth and excludes the LCD cutouts (see for example FIG. 9C).

FIG. 9C through FIG. 9F show perspective views of a drawer system in accordance with an exemplary embodiment of the present invention. In some exemplary embodiments, chamber 400 may employ a drawer system that facilitates access to a platform such as a mounting platform for mounting or positioning 3D-printed objects within chamber 400. In exemplary embodiments, the drawer system is aimed at maximizing a usable area while minimizing the overall footprint. The drawer system may employ a push to close design which locks at the close position.

In some exemplary embodiments, the drawer system comprises a front cover 454 that may be made of a UV blocking material. The drawer design may implement an opening height to restrict the height of the model to a maximum permissible height. This ensures no contact between the LED panels (418, 420 inside chamber 400) and the 3D-printed object situated within a platform (such as a tray) of the drawer system. The drawer system may employ a magnetic sensor to detect the state of the drawer, which offers a safety switch that switches off the heater device and the UV LEDs when the drawer is opened. In exemplary embodiments, the drawer system comprises: a drawer 460, which includes a door with a handle 452, a front cover 454 and front panel 456 that provide UV shielding around the opening into the chamber 400, and a tray system including a tray holder 444 that sits within a portion of drawer 460, a tray handle 446 and a tray mesh 448. The drawer system enables a platform, such as tray or tray mesh 448, to entirely slide out of chamber 400. The tray mesh 448 may be placed on tray holder 444 which is connected to a drawer slider 450. The tray handle 446 enables the user to lift the tray to add convenience while placing the 3d-printed objects or modes onto the platform or tray mesh 448. In exemplary embodiments, such as the one shown in these views, includes a platform configured to enable exposure to curing light from above as well as from underneath the platform. For example, and without limiting the scope of the present invention, tray mesh 448 may comprise a plurality of openings that facilitate exposure to UV light from the bottom or below the 3D-printed objects that are disposed on tray mesh 448. In some exemplary embodiments, a UVC and UVA transparent material may be used to form the base of the platform. In some exemplary embodiments, tray mesh 448 has a large open area to total area percentage of 58%. As can be appreciated from FIG. 9D, supports 462, such as frictional supports that may include, without limitation, rubber feet, may be utilized as a support mechanism that prevents the outer enclosure from sliding or moving during use.

Figure 9G:
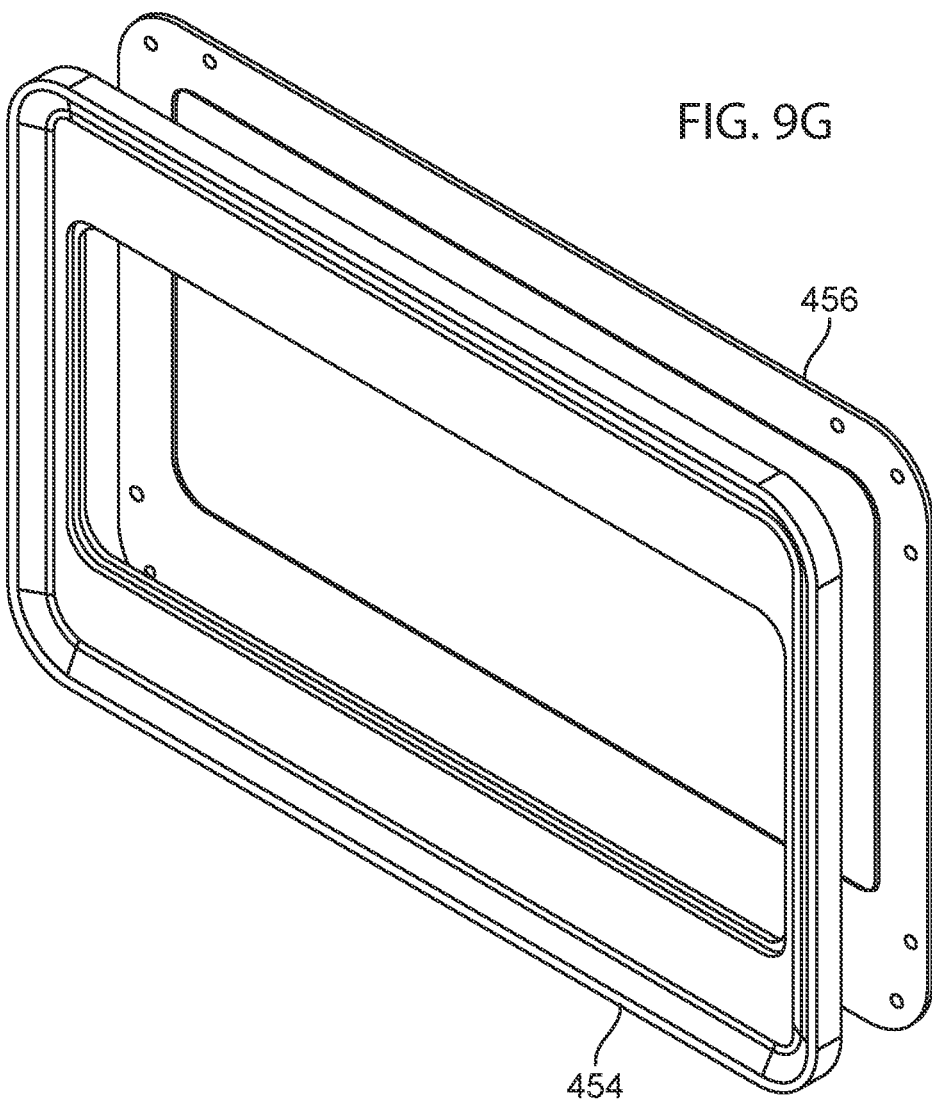
FIG. 9G exemplarily illustrates a perspective view of a front cover and panel of the post curing chamber, according to an embodiment of the present invention.

FIG. 9G shows an isometric view of a front panel in accordance with an exemplary embodiment of the present invention. In exemplary embodiments, the front cover 454 is modular; it may be coupled to the front panel using location pins to constraint the movement parallel to the front panel 456 and magnets to constraint movement perpendicular to the front panel 456. Alternatively, fasteners can be used to make the front cover accessible. This enables the user to disassemble the front cover 454 and perform cleaning operations on the part.

Figure 11:
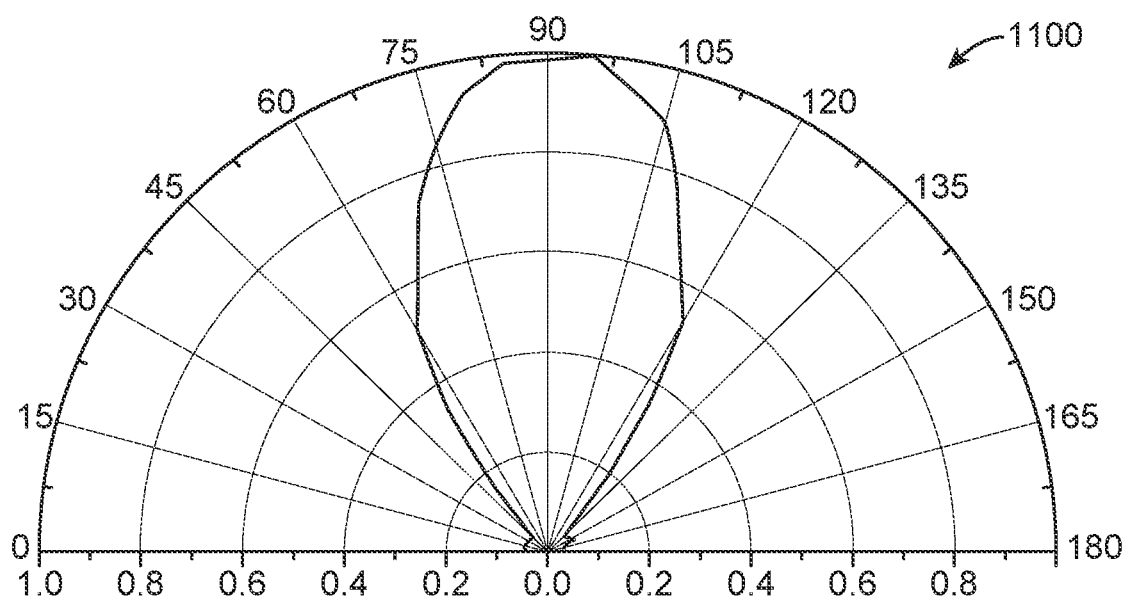
FIG. 11 exemplarily illustrates a graph of radiation patterns for a post curing system, according to another embodiment of the present invention.

FIG. 10 and FIG. 11 illustrate graphs (1000, 1100) of radiation patterns for a post curing system in accordance with an exemplary embodiment of the present invention. In the exemplary embodiment, the post curing system provides uniform curing using two factors that result in different intensities and different points on the trays: the light source and the light intensity. The light source, UV LEDs have a characteristic radiation pattern which provides the curve for relative power output vs angle. This brings a gradient of optical power incident on the illuminated area. The light intensity is inversely proportional to the square of distance between the measurement point and the light source. This is the second source of non-uniformity on the illuminated area.

In another exemplary embodiment of the present invention, the post curing system uses UVA LED with viewing angle 120 degrees and UVC LED with viewing angle of 60 degrees. The viewing angle is described as the angle made with normal to the LED at which the relative optical power output is 50% of the maximum. The layout for the LED has been designed keeping in mind requirements for uniformity on the illuminated area. The distribution was transformed to relative optical power output vs solid angle. The formula used for translating 2-D angle to solid angle is Formula (1). A cartesian coordinate system was chosen to factor in the distance from the light source. The distance and angle between light source and reference point was obtained using the coordinate system using Formula (2). The intensity at reference point is found using the Formula (3). These formulas are as follows:

$$\Omega = 2\pi(1-\cos\theta) \quad \text{Formula (1)};$$

$$D = \sqrt{((x1-x2)^2 + (y1-y2)^2 + (z1-z2)^2)} \quad \text{Formula (2)};$$

$$I0 * \Sigma(\Delta\Omega i * xi) = P/r^2 \quad \text{Formula (3)};$$

where D is the distance between two points; x1,y1,z1 are the location of the LED in cartesian coordinate system; x2, y2, z2 are location of reference point in cartesian coordinate system; I0 is the irradiance; $\Delta\Omega i$ is the solid angle coverage; and Xi is the intensity factor for the solid angle coverage.

The total intensity at the reference point was calculated using superposition theorem and is the sum of intensities from all the LEDs at the point. The LEDs are distributed with higher densities near the end and in the center to make the sum of intensities uniform across the illuminated area. The uniformity data from the panel is as follows. The LED distribution also focuses on the heat generated by the LEDs. The concentration of LEDs on the ends is limited by the amount of heat generated locally on the edges and the ability to dissipate the heat efficiently. The heat flux was limited to 1 Watt/cm2.

Figure 12:
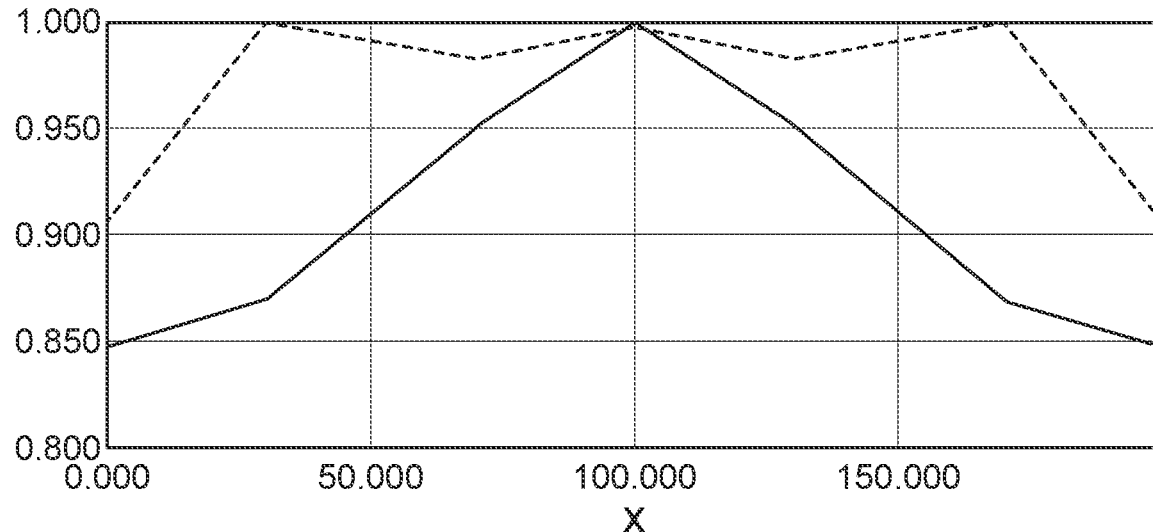
FIG. 12 exemplarily illustrates a graph of relative intensity of light source of bottom and top panel, according to an embodiment of the present invention.
Figure 13:
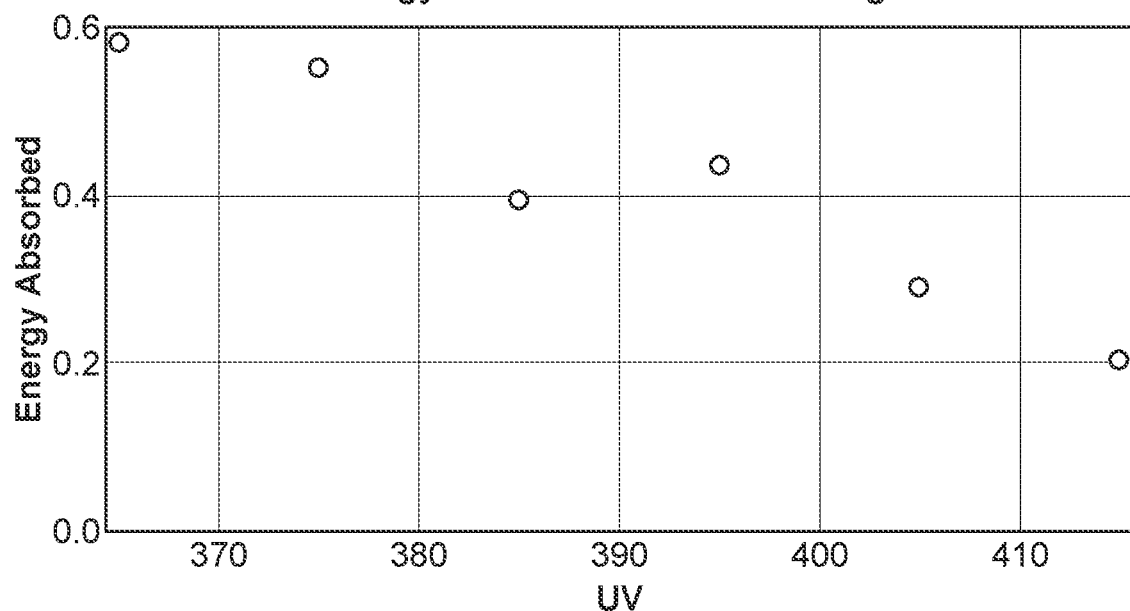
FIG. 13 exemplarily illustrates a graph of energy absorption for a post curing system, according to an embodiment of the present invention.

FIG. 12 illustrates a graph 1200 of relative intensity of light source of bottom and top panel, according to an embodiment of the present invention. FIG. 13 illustrates a graph 1300 of energy absorption for a post curing system in accordance with an exemplary embodiment of the present invention. The photopolymers have photoinitiators which either through radical formation or cationic initiation, initiate the polymerization. The photoinitiator absorbs energy from the UV light to form free radicals which causes the reaction. The photoinitiators used in photopolymers have a local maxima in absorbance at 365 nm wavelength and the absorbance decreases below 0.1 at wavelength above 420 nm. The absorption gives the efficiency of curing. To decide the optimal wavelength, the overall efficiency was calculated by multiplying the operating efficiency of the LED by the efficiency of curing, shown in Formula (4) and (5).

$$\text{Operating efficiency} = (\text{Optical Power Output}) \div (\text{Forward voltage} * \text{Forward current}) \quad \text{Formula (4)};$$

$$\text{Overall efficiency} = \text{Operating efficiency} * \text{Wavelength efficiency} \quad \text{Formula (5)}.$$

Figure 14:
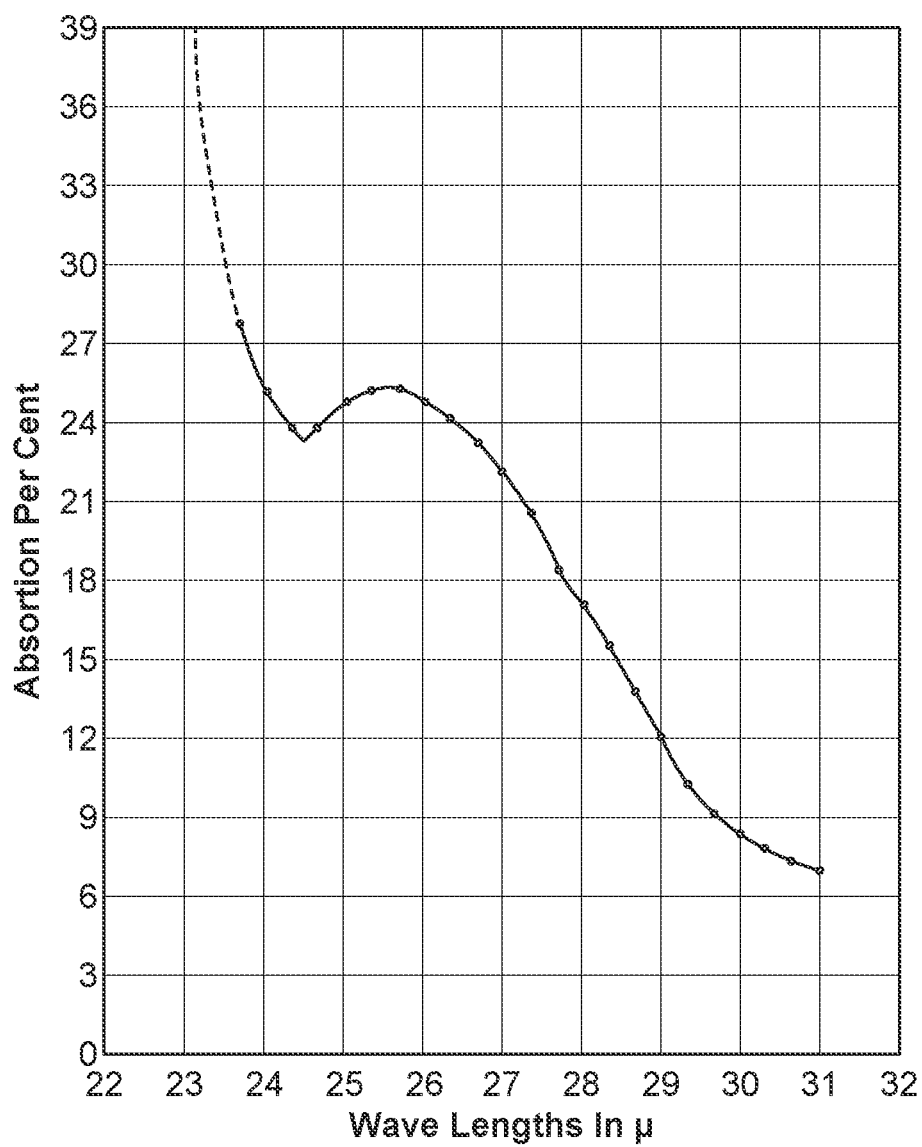
FIG. 14 exemplarily illustrates a graph for absorbance of UVC by e-coli bacteria, according to an embodiment of the present invention.

FIG. 14 illustrates a graph 1400 for absorbance of UVC by e-coli bacteria in accordance with an exemplary embodiment of the present invention. UV light below 280 nm in wavelength destroys nucleic acid in the microorganisms and kills them by disrupting their DNA. The efficiency of destroying nucleic acid depends on the absorption of UV light of different wavelengths. Prior research shows that the absorption of UV has local minima at around 255 nm (25% absorption) and it is much higher at lower wavelengths (greater than 27% below 235 nm). While the efficiency of disinfection increases as the wavelength is decreased, wavelengths below 240 nm cause photolysis of oxygen to ozone which is not desired. The primary sources of UVC light are, low pressure/high pressure mercury lamps, excimer lamps and LEDs. The product uses UVC LEDs as the light source. UV LEDs with wavelength ranging from 265 to 280 nm were evaluated and the overall efficiency was used as a factor to determine the optimal wavelength. The LED system had two different efficiencies, the operating efficiency and the absorption efficiency for nucleic acid. The overall efficiency was obtained as a product of the two efficiencies.

Figure 15:
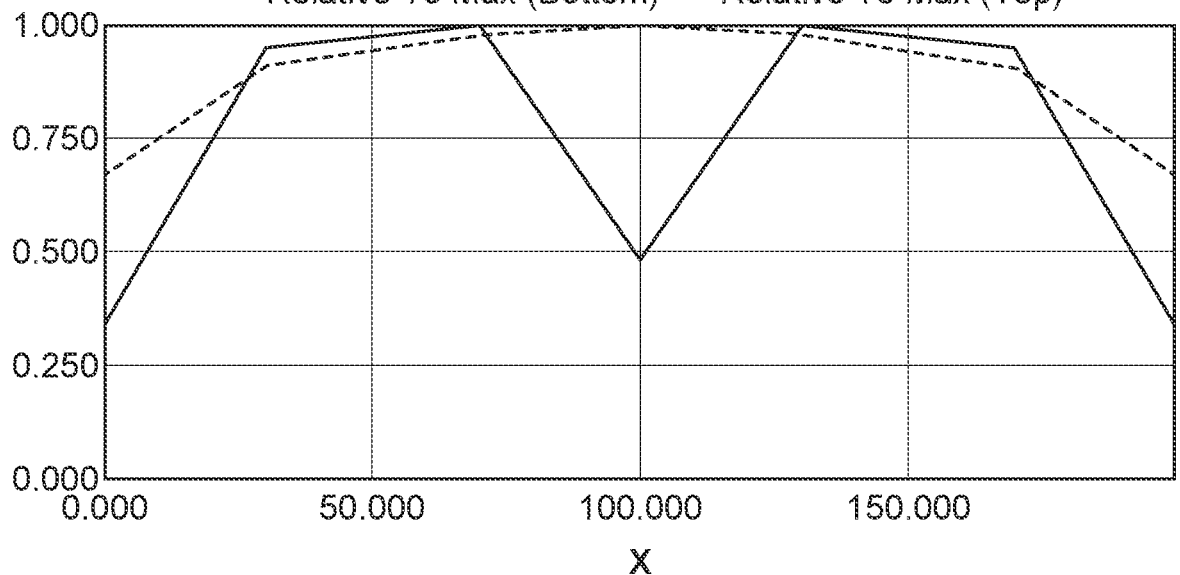
FIG. 15 exemplarily illustrates a graph of UVC intensity of the post curing system, according to an embodiment of the present invention.
Figure 16:
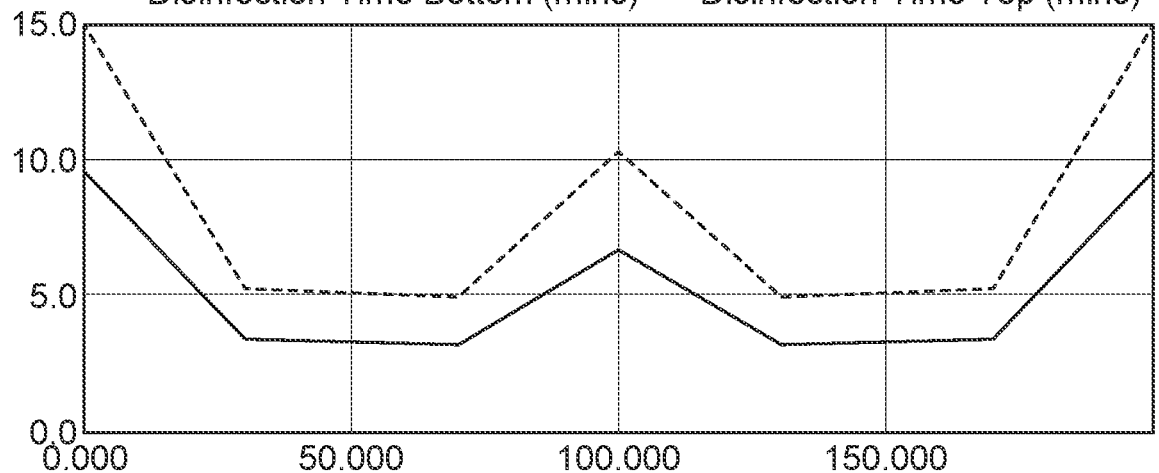
FIG. 16 exemplarily illustrates a graph of UVC intensity of the post curing system, according to another embodiment of the present invention.

In another exemplary embodiment of the present invention, a common issue with UVC disinfection devices is the inability to disinfect in the presence of undercut regions. The product focuses on disinfecting the surface of printed models and reduces the event of shadow regions by using two light sources, one from the bottom LED panel 420 and one from the top LED panel 418. Turning to the next set of figures, FIG. 15 and FIG. 16 show graphs (1500, 1600) of UVC intensity of a post curing system in accordance with an exemplary embodiment of the present invention. The disinfection depends on the energy that is delivered to the desired surface. The data published by FDA recommends a dosage of 186 mJ/cm2 for Log 4 level sterilization. According to our experiments, 300 mJ/cm2 dosage was needed for a log 2 sterilization of the surface. The intensity for UVC at the target area was calculated using Formula (6):

$$I0 * \Sigma(\Delta\Omega i * xi) = P/r^2 \quad \text{Formula (6)};$$

where I0 is the irradiance; $\Delta\Omega i$ is the solid angle coverage; and Xi is the intensity factor for the solid angle coverage.

More specifically, FIG. 15 shows one exemplary embodiment of the present invention, in which superposition theorem was used to determine the combined intensity in the target area. The uniformity across the target area is shows in FIG. 15. This gave a disinfection time performance curve as shown in FIG. 16, which was calculated by dividing the target dosage by the intensity.

Figure 17:
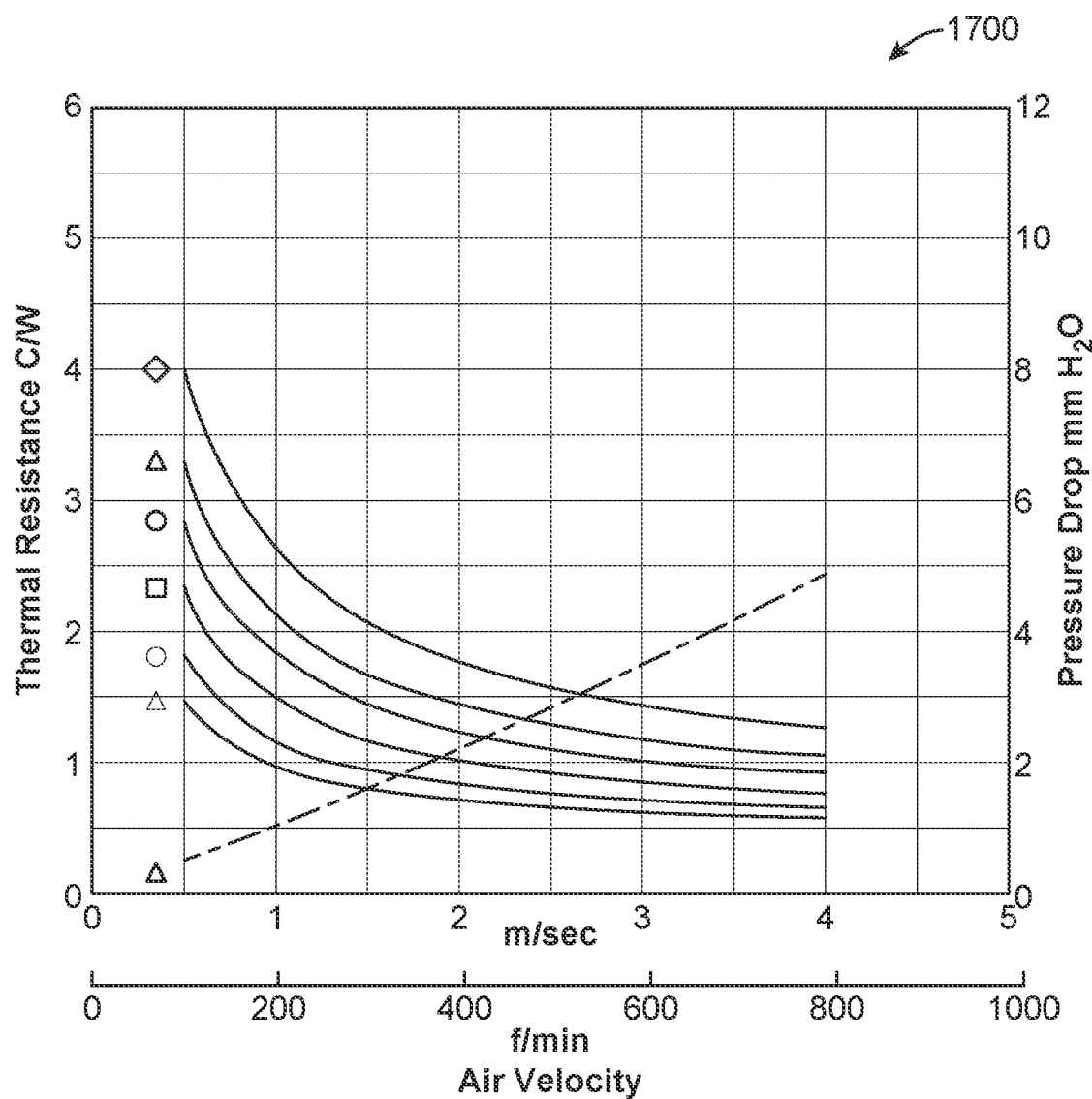
FIG. 17 exemplarily illustrates a graph for thermal resistance and airflow temperature, according to an embodiment of the present invention.

FIG. 17 illustrates another exemplary embodiment of the present invention in which the rate of heat transfer is directly proportional to surface area in contact with the air. Heat sink 426 is used to increase the surface area for heat transfer. The second factor in the heat transfer equation is the convection coefficient which depends on the airflow velocity. The thermal resistance and the airflow temperature characteristic curve for the heat sink is shown in graph 1700 of FIG. 17. The pressure drop due the heat sink is also a function of the airflow velocity. The heat sink 426 has optimized elliptical shaped fins to facilitate airflow and decrease the pressure drop across the heat sink while maintaining high surface area for heat transfer.

In another exemplary embodiment of the present invention, the heat sink 426 and aluminum PCB have machined surfaces but to have the best heat transfer between the surfaces, an interface material needs to be used in between them. The interface material has high thermal conductivity and goes into the void to fill any gaps between the two surfaces. The material used can be thermal grease, which when pressed between the two surfaces can go into the void or a phase changing material which acts like a sheet under room temperature but changes its shape under higher temperature to flow in and fill the gaps. The alternative material choice which is being used in the product is thermal pad 432 which is a soft sheet which is sandwiched between the heat sink 426 and the aluminum PCB.

Figure 18:
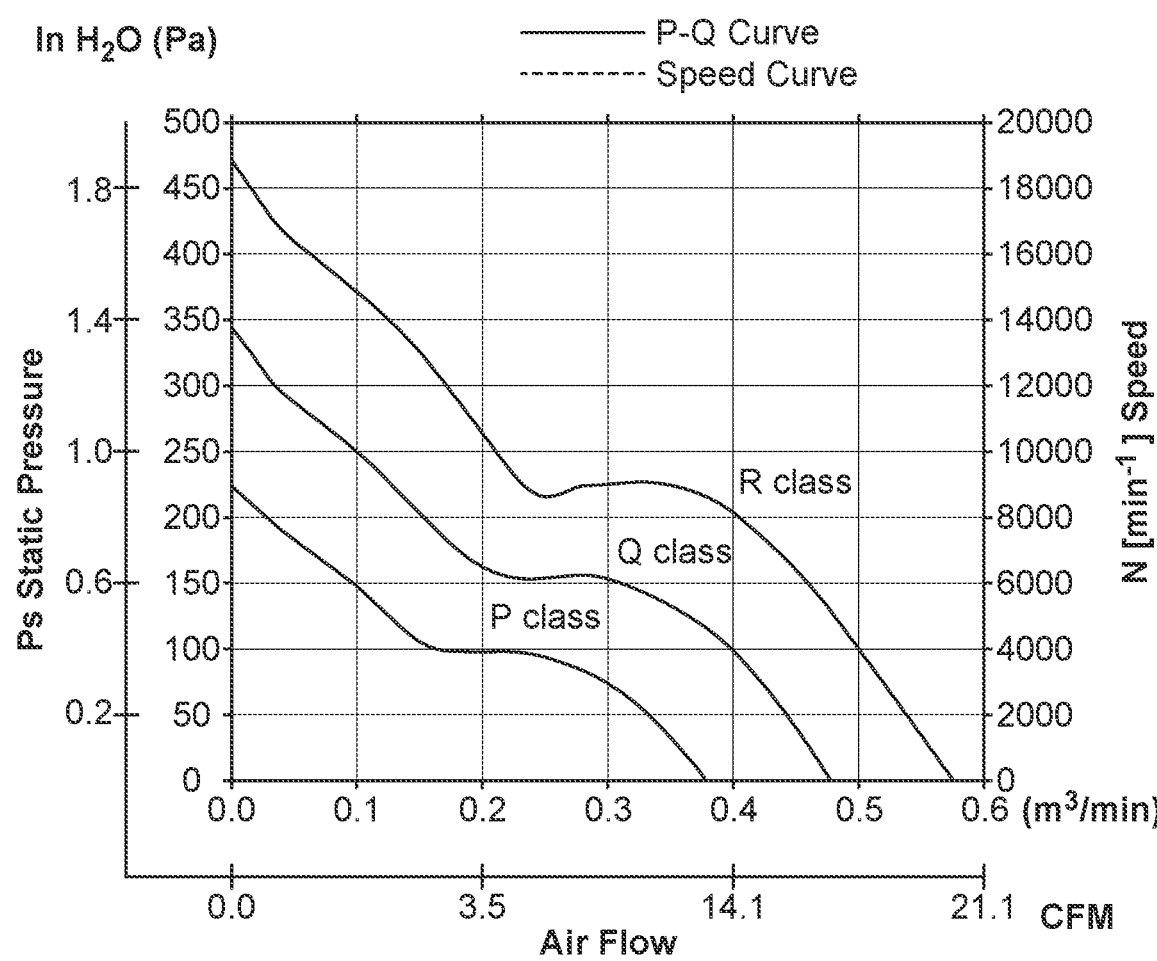
FIG. 18 is a graph showing relation between airflow and heat dissipation, according to an embodiment of the present invention.

FIG. 18 illustrates another exemplary embodiment of the present invention in which the LED heat dissipation relies on forced convection. The relation between the airflow and the heat dissipation is given by graph 1800. The fan statistic curve or static pressure curve provides a relation between the pressure drop and the volumetric flow rate. The operating point for the fan 422 is the intersection of the fan static pressure curve and the system pressure curve. The system pressure curve is the pressure drop across the system, which in the products case is the sum of pressure drop across the heat sink, the front cap and front and back walls of the chamber 400. This is shows by Formula (9):

System Resistance Curve=Pressure drop across(Heat Sink+Front*Cap*+Wall at Inlets and Outlets)  Formula (9).

Based on the airflow vs pressure drop curve for heat sink and the static pressure curve, the operating point for the fan is decided.

A system and method for selectively post curing 3D objects printed with stereolithography additive manufacturing techniques has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A system for post-curing a three-dimensionally printed (3D-printed) object, comprising:
    a chamber;
    a platform arranged within the chamber for supporting at least one 3D-printed object;
    a light source assembly configured to emit one or more wavelengths of curing light onto the 3D-printed object, wherein the light source assembly includes a first light support member configured to hold at least one first light source pointed in a first direction and a second light support member configured to hold at least one second light source pointed in a second direction, the second direction distinct from the first direction;
    a movement module configured to move the first and second light support members simultaneously, or the platform, to expose different regions of the 3D-printed object to the curing light.

2. The system of claim 1, wherein the second direction is opposite the first direction.

3. The system of claim 1, wherein the first light support member is disposed above the platform and/or the second light support member is disposed below the platform.

4. The system of claim 1, wherein the second direction is orthogonal to the first direction, is at an acute angle with respect to the first direction, or is at an obtuse angle with respect to the first direction.

5. The system of claim 1, wherein the platform includes a surface adapted to receive the 3D-printed object, the surface including: a mesh, or a material made of at least one of an ultraviolet C transparent material and an ultraviolet A transparent material.

6. The system of claim 1, wherein the at least one first light source comprises a first Light Emitting Diode (LED) module and/or the at least second light source comprises a second LED module for emitting the one or more wavelengths of the curing light onto the 3D-printed object.

7. The system of claim 1, wherein the light source assembly comprises a lens system for volume coverage of the 3D printed object, the lens system including one or more convex lenses adapted to move relative to the light source assembly for changing a volume coverage area of the 3D-printed object.

8. The system of claim 1, wherein the movement module is adapted to facilitate at least one of continuous motion, motion having multiple stationary points, or bidirectional motion of the light source assembly or the platform.

9. The system of claim 1, wherein the movement module comprises a linear motion system coupled to the first light support member and/or to the second light support member to facilitate movement of the first light support member and/or of the second light support member along a length within the chamber.

10. The system of claim 1, wherein the movement module is configured to rotate the light source assembly or the platform.

11. The system of claim 1, wherein the movement module is configured to physically tilt the light source assembly or the platform.

12. The system of claim 1, wherein the movement module includes a position sensor for determining a position of the light source assembly or the platform.

13. The system of claim 1, wherein the platform includes a drawer system for facilitating insertion and removal of the platform in and out of the chamber.

14. The system of claim 1, further comprising a heating element situated inside the chamber.

\* \* \* \* \*